(12) United States Patent
Yoo et al.

(10) Patent No.: US 12,457,415 B2
(45) Date of Patent: Oct. 28, 2025

(54) METHOD FOR EXECUTING APPLICATION, AND ELECTRONIC DEVICE SUPPORTING SAME

(71) Applicant: SAMSUNG ELECTRONICS CO., LTD., Suwon-si (KR)

(72) Inventors: Junsang Yoo, Suwon-si (KR); Taehoon Kim, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 18/458,645

(22) Filed: Aug. 30, 2023

(65) Prior Publication Data

US 2023/0412920 A1 Dec. 21, 2023

Related U.S. Application Data

(63) Continuation of application No. PCT/KR2022/002966, filed on Mar. 3, 2022.

(30) Foreign Application Priority Data

Apr. 16, 2021 (KR) .................. 10-2021-0049628

(51) Int. Cl.
*H04N 23/667* (2023.01)
*H04M 1/02* (2006.01)
(Continued)

(52) U.S. Cl.
CPC ........ *H04N 23/667* (2023.01); *H04M 1/0214* (2013.01); *H04M 1/0268* (2013.01);
(Continued)

(58) Field of Classification Search
CPC ............ H04M 1/0268; H04M 1/0243; H04M 1/0214; H04N 23/62; H04N 23/633;
(Continued)

(56) References Cited

U.S. PATENT DOCUMENTS 8,553,008 B2 10/2013 Cho et al.
8,659,574 B2 2/2014 Cho et al.
(Continued)

FOREIGN PATENT DOCUMENTS

KR 20100082451 A 7/2010
KR 20140128709 A 11/2014
(Continued)

OTHER PUBLICATIONS

International Search Report for PCT/KR2022/002966 mailed Jun. 24, 2022, 4 pages.
(Continued)

*Primary Examiner* — Pritham D Prabhakher
(74) *Attorney, Agent, or Firm* — Nixon & Vanderhye P.C.

(57) ABSTRACT

A foldable electronic device may include a flexible display, a sensor circuit, a processor and a memory. The foldable electronic device may be such that it: executes an application on the basis of a first mode, if a folding angle is within a first range; identifies a folding angle via the sensor circuit according to a first cycle while the application is executed in the first mode; if the identified folding angle is not within the first range, switches the execution mode of the application from the first mode to a second mode; and changes the range for switching the execution mode of the application from the first range to the second range based on at least one of the identified folding angles.

15 Claims, 16 Drawing Sheets

(51) Int. Cl.
  *H04N 23/62* (2023.01)
  *H04N 23/63* (2023.01)
(52) U.S. Cl.
  CPC .......... *H04N 23/62* (2023.01); *H04N 23/631* (2023.01); *H04N 23/633* (2023.01)
(58) Field of Classification Search
  CPC ...... H04N 23/667; H04N 23/631; G06F 3/00; G06F 3/14; G06F 3/048; G06F 1/16
  USPC ..................................................... 348/333.02
  See application file for complete search history.

(56) References Cited

U.S. PATENT DOCUMENTS

| | | | |
|---|---|---|---|
| 8,669,956 B2 | 3/2014 | Cho et al. | |
| 8,669,961 B2 | 3/2014 | Cho et al. | |
| 9,069,378 B2 | 6/2015 | Cho et al. | |
| 9,324,303 B2 | 4/2016 | Ma et al. | |
| 9,684,342 B2 | 6/2017 | Kim et al. | |
| 9,746,883 B2 | 8/2017 | Lee et al. | |
| 9,830,075 B2 | 11/2017 | Kim et al. | |
| 9,880,729 B2 | 1/2018 | Rakshit | |
| 9,952,706 B2 | 4/2018 | Cho et al. | |
| 10,228,842 B2 | 3/2019 | Rakshit | |
| 10,248,224 B2 | 4/2019 | Klein et al. | |
| 10,545,900 B2 * | 1/2020 | Burns ................. | G06F 13/4068 |
| 10,678,428 B2 | 6/2020 | Kim et al. | |
| 10,754,483 B2 * | 8/2020 | Seo ..................... | G06F 3/04166 |
| 11,068,074 B2 | 7/2021 | Lee et al. | |
| 11,093,203 B2 * | 8/2021 | Park ..................... | G06F 1/3231 |
| 11,126,223 B2 | 9/2021 | Seo et al. | |
| 11,445,097 B2 | 9/2022 | Ko et al. | |
| 2007/0149262 A1 | 6/2007 | Navntoft | |
| 2010/0182265 A1 | 7/2010 | Kim et al. | |
| 2014/0028597 A1 | 1/2014 | Cho et al. | |
| 2014/0132506 A1 | 5/2014 | Cho et al. | |
| 2014/0184489 A1 | 7/2014 | Ma et al. | |
| 2015/0116364 A1 * | 4/2015 | Aurongzeb ........... | G06F 1/1649 345/659 |
| 2016/0034047 A1 | 2/2016 | Lee et al. | |
| 2016/0098063 A1 | 4/2016 | Lee et al. | |
| 2017/0094168 A1 * | 3/2017 | Kang .................. | H04N 23/667 |
| 2017/0185215 A1 * | 6/2017 | Kim ...................... | G06F 1/1652 |
| 2017/0229100 A1 * | 8/2017 | Chun ....................... | G09G 5/38 |
| 2018/0052579 A1 | 2/2018 | Rakshit | |
| 2018/0089131 A1 * | 3/2018 | Burns .................. | G06F 9/4411 |
| 2018/0113520 A1 | 4/2018 | Klein et al. | |
| 2020/0012367 A1 * | 1/2020 | Seo ....................... | G06F 1/1652 |
| 2020/0301641 A1 * | 9/2020 | Park ...................... | G06F 1/3265 |
| 2020/0333834 A1 | 10/2020 | Seo et al. | |
| 2020/0364021 A1 * | 11/2020 | Park ........................ | H04N 23/51 |
| 2021/0041912 A1 * | 2/2021 | Eom ...................... | G06F 3/017 |
| 2021/0105389 A1 | 4/2021 | Ko et al. | |
| 2021/0398465 A1 * | 12/2021 | Kim ........................ | G06F 3/041 |
| 2022/0004225 A1 | 1/2022 | Seo et al. | |
| 2022/0066502 A1 * | 3/2022 | Fujiwara ............. | G06F 3/04886 |

FOREIGN PATENT DOCUMENTS

| | | |
|---|---|---|
| KR | 20160040909 A | 4/2016 |
| KR | 101659032 B1 | 9/2016 |
| KR | 102028175 B1 | 10/2019 |
| KR | 102204151 B1 | 1/2021 |
| KR | 20210041271 A | 4/2021 |

OTHER PUBLICATIONS

Written Opinion of the ISA for PCT/KR2022/002966 mailed Jun. 24, 2022, 4 pages.
Korean Office Action dated Aug. 11, 2025 for KR Application No. 10-2021-0049628.

* cited by examiner

METHOD FOR EXECUTING APPLICATION, AND ELECTRONIC DEVICE SUPPORTING SAME

CROSS-REFERENCE TO RELATED APPLICATIONS

This application is a continuation of International Application No. PCT/KR2022/002966, filed on Mar. 3, 2022, designating the United States, in the Korean Intellectual Property Receiving Office, and claiming priority to KR 10-2021-0049628 filed on Apr. 16, 2021, the disclosures of which are all hereby incorporated by reference herein in their entireties.

BACKGROUND

Field

Various example embodiments relate to a method for executing an application and/or an electronic device supporting the same.

Description of Related Art

An electronic device may visually provide various pieces of content (e.g., an image, text, and/or a video) using its display. Technologies for increasing a display surface of the electronic device have been developed. For example, to improve portability of the electronic device and a size of the display, a technology for changing a form of the electronic device has been developed. As an example, a part of the electronic device may be folded or extended.

Particularly, a foldable electronic device including a flexible display capable of being folded or unfolded has been recently commercialized. The foldable electronic device may display a user interface having various structures and forms on the flexible display as its folding angle is changed. For example, in a state where the foldable electronic device is unfolded, a user may receive various functions through a relatively wide display screen. For another example, in a state where the foldable electronic device is folded, the user may conveniently hold and use the foldable electronic device.

SUMMARY

An electronic device including a flexible display may operate in a plurality of modes based on a specified folding angle. For example, the electronic device may perform an operation in a first mode, a second mode, and a third mode respectively corresponding to a first range (e.g., where the folding angle is greater than or equal to 0 degree and is less than 80 degrees), a second range (e.g., where the folding angle is greater than or equal to 80 degrees and is less than 130 degrees), and a third range (e.g., where the folding angle is greater than or equal to 130 degrees and is less than 180 degrees) with respect the folding angle. The first mode and the third mode may be defined as substantially the same mode. Because a user does not intuitively recognize a folding angle corresponding to an intended operation mode (e.g., the second mode), there may occur a problem in which the electronic device performs a specific function (e.g., a camera application) in an operation mode (e.g., the first mode) which is not intended by the user in the process of changing the folding angle.

The user may want to receive a service based on a folding angle different for each application to be used. For example, when the user wants to receive a selfie function via the camera application, it may be preferable that the folding angle of the electronic device corresponds to the second range. For another example, when the user wants to receive a function included in a calendar application or an album application, it may be preferable that the folding angle of the electronic device corresponds to a folding angle changed by a certain angle in the second range. However, because the electronic device changes an operation mode based on a predetermined folding angle, it may be difficult to flexibly set the operation mode based on an application or an algorithm of changing a folding angle (e.g., a folding speed).

In accordance with an example embodiment(s), an electronic device is provided. The electronic device may include a flexible display, a sensor (or a senor circuit) configured to detect a folding angle of the foldable electronic device, a processor, and a memory operatively connected, directly or indirectly, with the processor. The memory may store instructions, when executed by the processor, may cause the processor to be configured for causing the foldable electronic device to execute an application based on a first mode, when the folding angle of the foldable electronic device belongs to a first range, identify the folding angle depending on a first period using the sensor, while executing the application in the first mode, switch the application from the first mode to a second mode, when the identified folding angle does not belong to the first range, and change a range for switching an execution mode of the application from the first range to a second range using at least a portion of the identified folding angle.

In accordance with an example embodiment(s), a method for executing an application in an electronic device is provided. The method may include executing the application based on a first mode, when a folding angle of the foldable electronic device belongs to a first range, identifying the folding angle depending on a first period using a sensor (or a sensor circuit), while executing the application in the first mode, switching the application from the first mode to a second mode, when the identified folding angle does not belong to the first range, and changing a range for switching an execution mode of the application from the first range to a second range using at least a portion of the identified folding angle.

According to an example embodiment(s), the electronic device may provide various functions with regard to the convenience of the user depending on a change in form.

According to an example embodiment(s), the electronic device may provide various user interfaces and/or graphic user interfaces (GUIs) based on a form which is operating.

According to an example embodiment(s), the electronic device may identify a folding angle and/or a folding speed of the flexible display and may flexibly change an operation mode, thus providing an application which is being executed in various structures.

According to an example embodiment(s), the electronic device may change an operation mode based on a different folding angle depending on a type of an application which is being executed, thus improving availability and convenience.

In addition, various effects ascertained directly or indirectly through the disclosure may be provided.

BRIEF DESCRIPTION OF DRAWINGS

The above and other aspects, features, and advantages of certain example embodiments will be more apparent from the following detailed description, taken in conjunction with the accompanying drawings, in which.

With regard to description of drawings, the same or similar denotations may be used for the same or similar components.

DETAILED DESCRIPTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
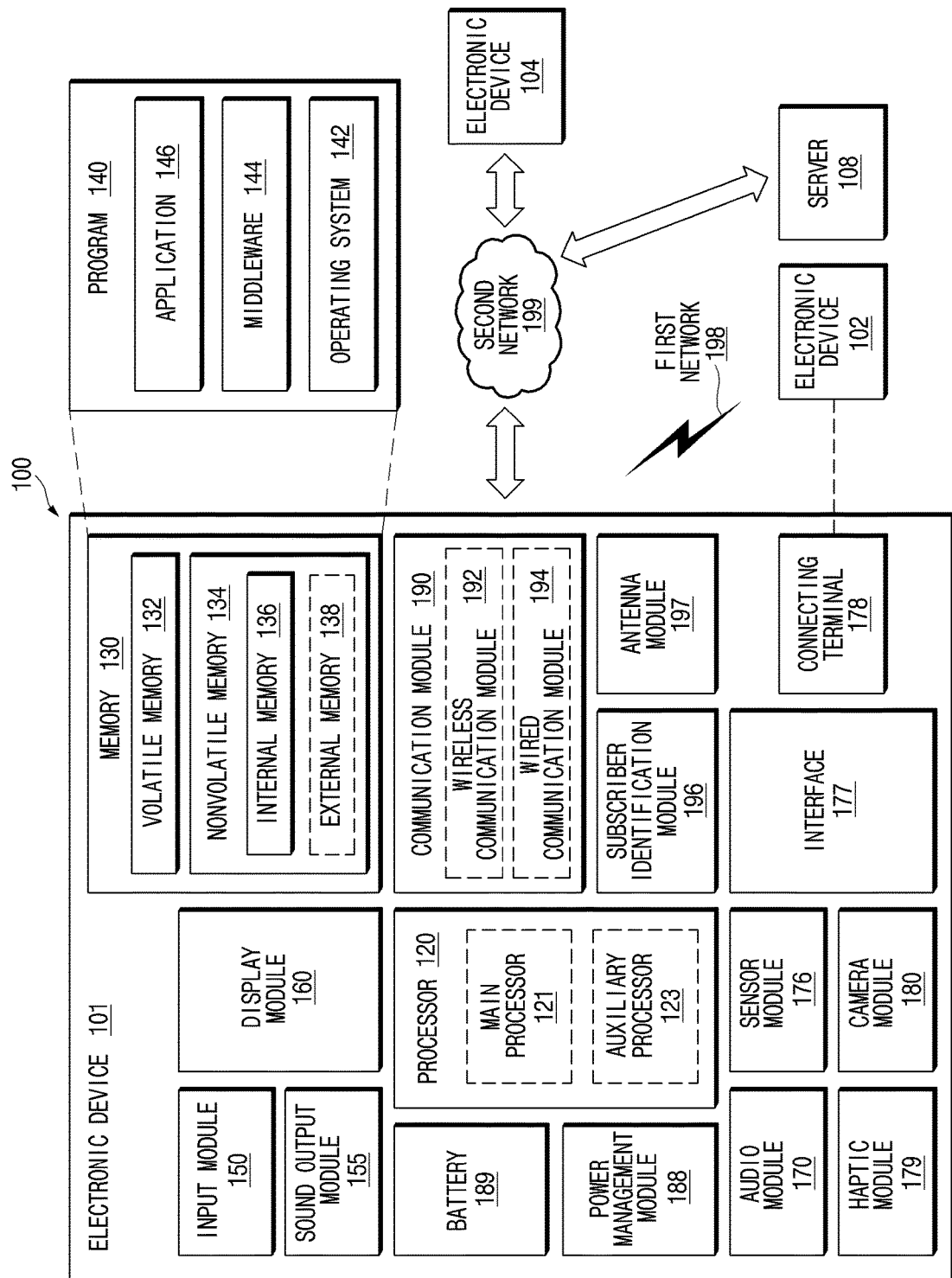
FIG. 1 is a block diagram illustrating an electronic device 101 in a network environment 100 according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled, directly or indirectly, with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled, directly or indirectly, with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected, directly or indirectly, with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled, directly or indirectly, with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
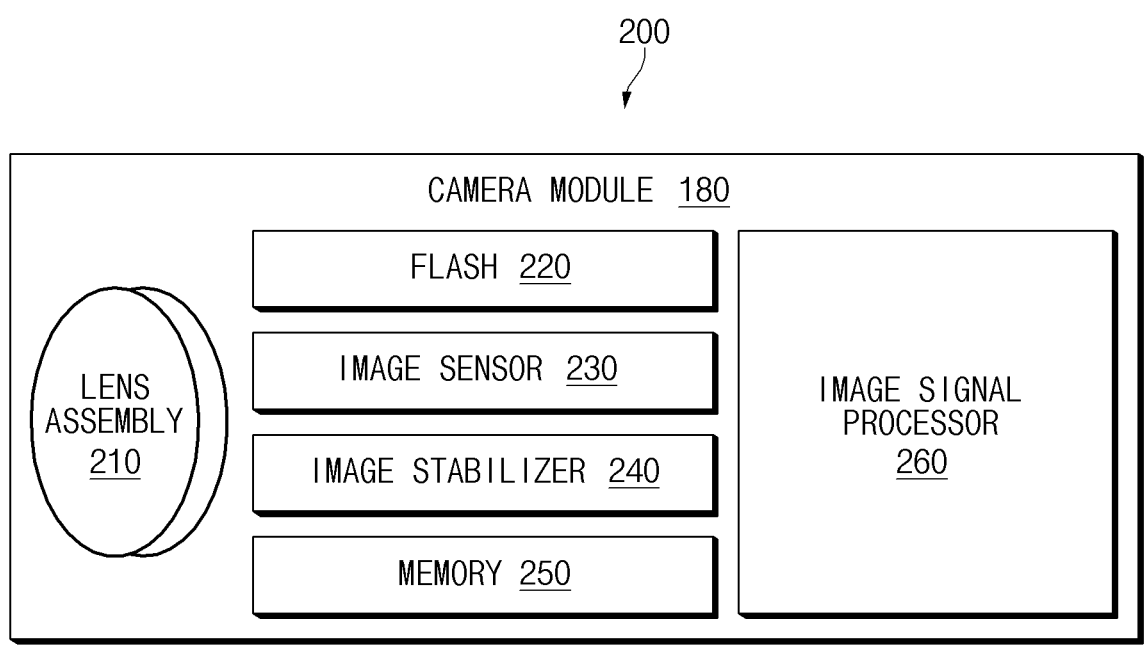
FIG. 2 is a block diagram 200 illustrating the camera module 180 according to various example embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
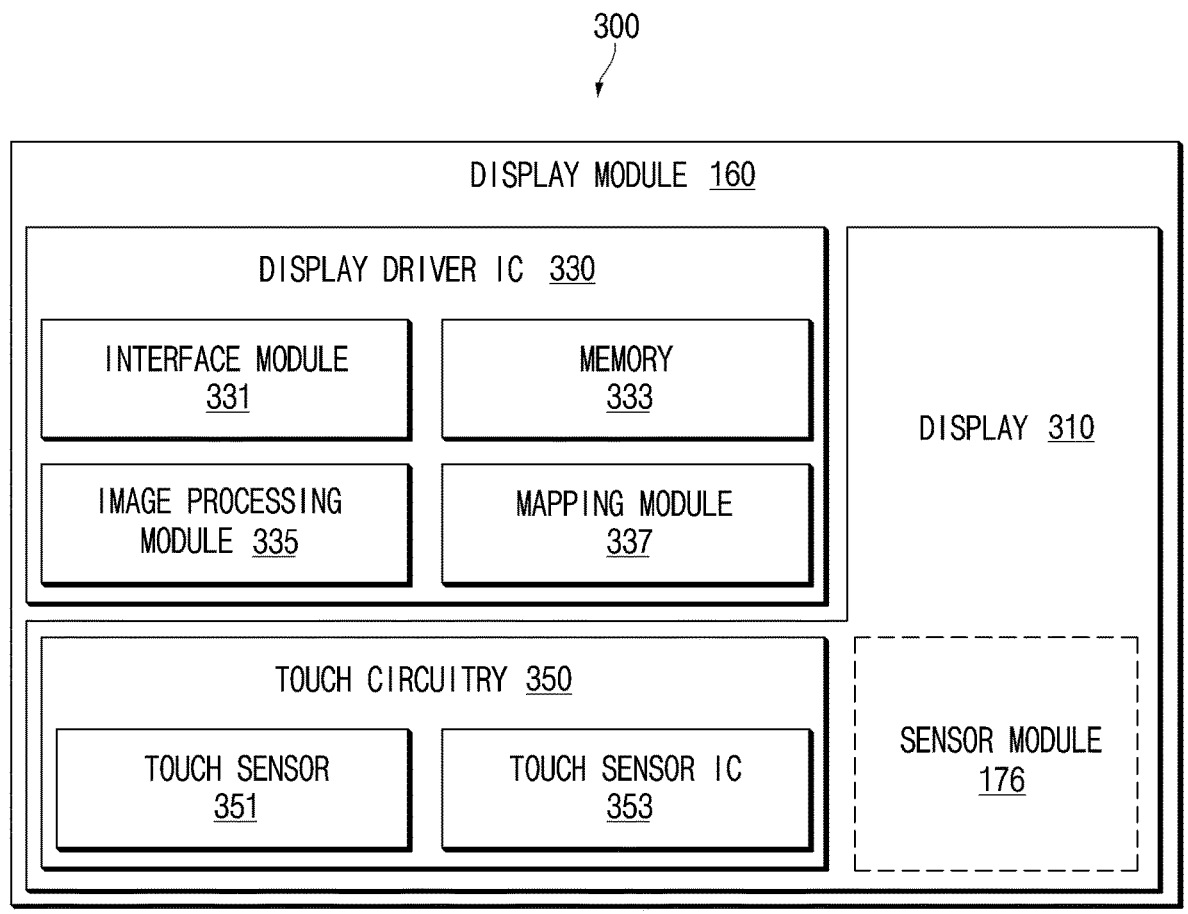
FIG. 3 is a block diagram 300 illustrating the display module 160 according to various example embodiments.

FIG. 3 is a block diagram 300 illustrating the display module 160 according to various embodiments. Referring to FIG. 3, the display module 160 may include a display 310 and a display driver integrated circuit (DDI) 330 to control the display 310. The DDI 330 may include an interface module 331, memory 333 (e.g., buffer memory), an image processing module 335, or a mapping module 337. The DDI 330 may receive image information that contains image data or an image control signal corresponding to a command to control the image data from another component of the electronic device 101 via the interface module 331. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 330 may communicate, for example, with touch circuitry 350 or the sensor module 176 via the interface module 331. The DDI 330 may also store at least part of the received image information in the memory 333, for example, on a frame by frame basis.

The image processing module 335 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 310.

The mapping module 337 may generate a voltage value or a current value corresponding to the image data pre-processed or post-processed by the image processing module 335. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 310 may be driven, for example, based at least in part on the voltage value or the current value such that visual information (e.g., a text, an image, or an icon) corresponding to the image data may be displayed via the display 310.

According to an embodiment, the display module 160 may further include the touch circuitry 350. The touch circuitry 350 may include a touch sensor 351 and a touch sensor IC 353 to control the touch sensor 351. The touch sensor IC 353 may control the touch sensor 351 to sense a touch input or a hovering input with respect to a certain position on the display 310. To achieve this, for example, the touch sensor 351 may detect (e.g., measure) a change in a signal (e.g., a voltage, a quantity of light, a resistance, or a quantity of one or more electric charges) corresponding to the certain position on the display 310. The touch circuitry 350 may provide input information (e.g., a position, an area, a pressure, or a time) indicative of the touch input or the hovering input detected via the touch sensor 351 to the processor 120. According to an embodiment, at least part (e.g., the touch sensor IC 353) of the touch circuitry 350 may be formed as part of the display 310 or the DDI 330, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 310, the DDI 330, or the touch circuitry 350) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 310. As another example, when the sensor module 176 embedded in the display module 160 includes a pressure sensor, the pressure sensor may obtain pressure information corresponding to a touch input received via a partial or whole area of the display 310. According to an embodiment, the touch sensor 351 or the sensor module 176 may be disposed between pixels in a pixel layer of the display 310, or over or under the pixel layer.

Figure 4:
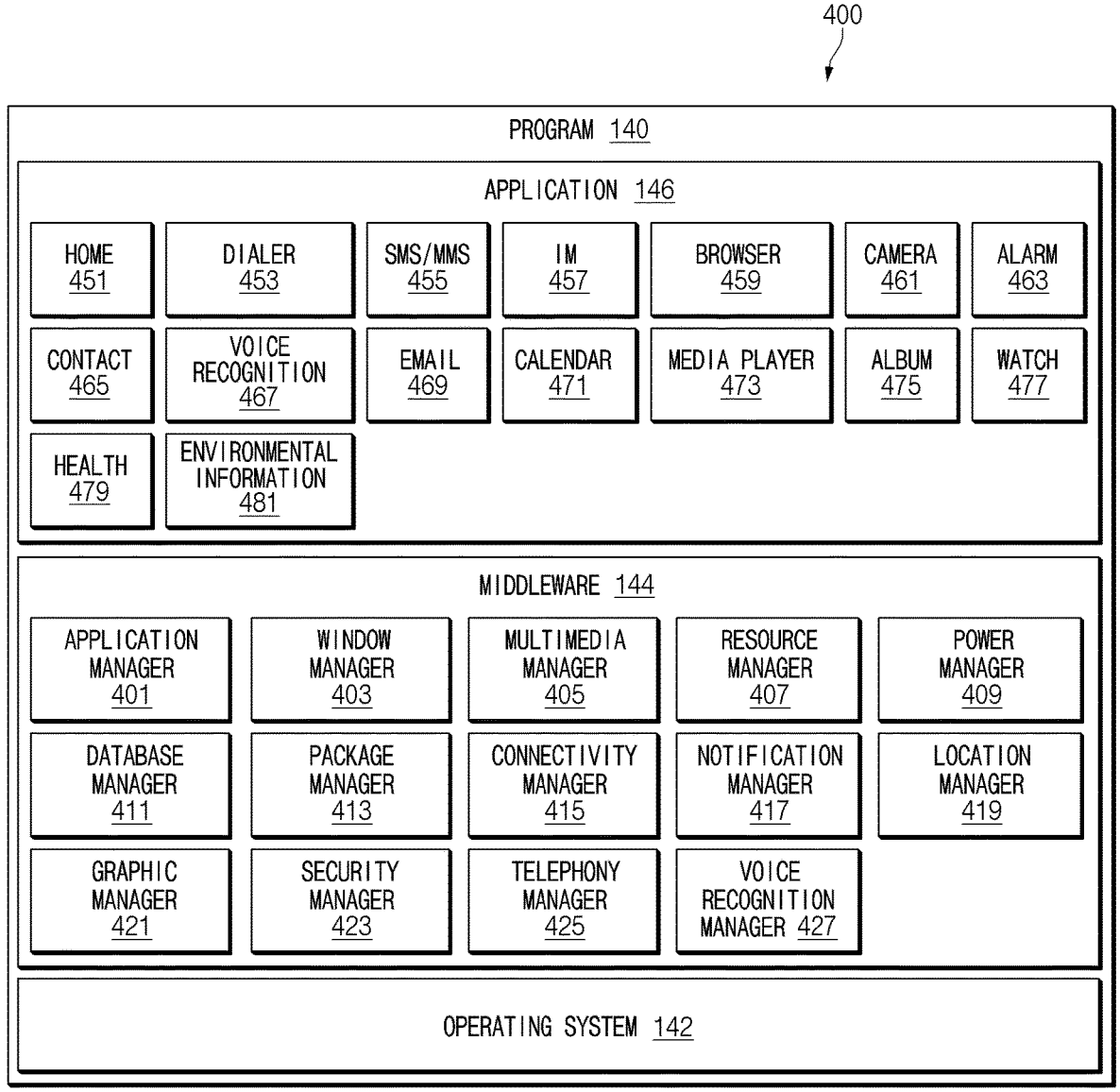
FIG. 4 is a block diagram 400 illustrating the program 140 according to various example embodiments.

FIG. 4 is a block diagram 400 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 401, a window manager 403, a multimedia manager 405, a resource manager 407, a power manager 409, a database manager 411, a package manager 413, a connectivity manager 415, a notification manager 417, a location manager 419, a graphic manager 421, a security manager 423, a telephony manager 425, or a voice recognition manager 427.

The application manager 401, for example, may manage the life cycle of the application 146. The window manager 403, for example, may manage one or more graphical user interface (GUI) resources that are used on a screen. The multimedia manager 405, for example, may identify one or more formats to be used to play media files, and may encode or decode a corresponding one of the media files using a codec appropriate for a corresponding format selected from the one or more formats. The resource manager 407, for example, may manage the source code of the application 146 or a memory space of the memory 130. The power manager 409, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 409 may interwork with a basic input/output system (BIOS) (not shown) of the electronic device 101.

The database manager 411, for example, may generate, search, or change a database to be used by the application 146. The package manager 413, for example, may manage installation or update of an application that is distributed in the form of a package file. The connectivity manager 415, for example, may manage a wireless connection or a direct connection between the electronic device 101 and the external electronic device. The notification manager 417, for example, may provide a function to notify a user of an occurrence of a specified event (e.g., an incoming call, message, or alert). The location manager 419, for example, may manage locational information on the electronic device 101. The graphic manager 421, for example, may manage one or more graphic effects to be offered to a user or a user interface related to the one or more graphic effects.

The security manager 423, for example, may provide system security or user authentication. The telephony manager 425, for example, may manage a voice call function or a video call function provided by the electronic device 101. The voice recognition manager 427, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 444 may dynamically delete some existing components or add new components. According to an embodiment, at least part of the middleware 144 may be included as part of the OS 142 or may be implemented as another software separate from the OS 142.

The application 146 may include, for example, a home 451, dialer 453, short message service (SMS)/multimedia messaging service (MMS) 455, instant message (IM) 457, browser 459, camera 461, alarm 463, contact 465, voice recognition 467, email 469, calendar 471, media player 473, album 475, watch 477, health 479 (e.g., for measuring the degree of workout or biometric information, such as blood sugar), or environmental information 481 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 469) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 5:
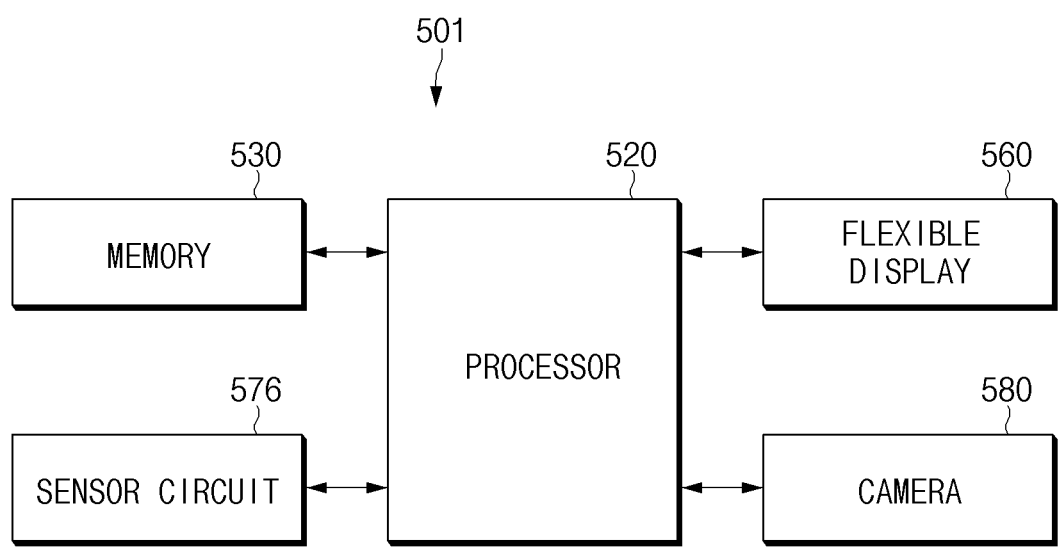
FIG. 5 is a block diagram illustrating components of an electronic device, according to an example embodiment.

FIG. 5 is a block diagram illustrating components of an electronic device 501, according to an embodiment.

Referring to FIG. 5, according to an embodiment, the electronic device 501 disclosed in the disclosure may include at least some of components of the electronic device (e.g., the electronic device 101 of FIG. 1) described above in conjunction with FIG. 1. For example, the electronic device 501 may include a processor 520 (e.g., a processor 120 of FIG. 1), a memory 530 (e.g., a memory 130 of FIG. 1), a flexible display 560 (e.g., a display module 160 of FIG. 1, comprising a display), a sensor circuit 576 (or a sensor) (e.g., a sensor module 176 of FIG. 1, comprising at least one sensor), and/or a camera 580 (e.g., a camera module 180 of FIG. 1, comprising a camera). The electronic device 501 to be described below may be referred to as a device in a foldable form, but embodiments of the disclosure are not limited thereto. For example, the electronic device 501 may be implemented in the form of a bendable device and/or a rollable device.

According to an embodiment, the processor 520 may be referred to as one component for processing various processes executed by the electronic device 501. The processor 520 may be electrically or operatively coupled to (or connected, directly or indirectly, with) other components (e.g., the memory 530, the flexible display 560, the sensor circuit 576, and/or the camera 580) of the electronic device 501 and may be configured to control the other components of the electronic device 501. In an embodiment, the processor 520 may process a data processing function provided by the electronic device 501 using information stored in the memory 530. In an embodiment, the processor 520 may divide the flexible display 560 into a plurality of areas and may identify pieces of information and/or user interfaces displayed on the divided areas. In an embodiment, the processor 520 may identify motion information (e.g., a folding angle and/or a folding speed) of the electronic device

501 using the sensor circuit 576. As an example, the processor 520 may store the information obtained using the sensor circuit 576 in the memory 530. In an embodiment, the processor 520 may obtain at least one image using the camera 580.

According to an embodiment, the memory 530 may store a command or data. For example, the memory 530 may store instructions, when executed by the processor 520, causing the electronic device 501 to perform various operations. For another example, the memory 530 may store information associated with various functions provided by the electronic device 501. As an example, the memory 530 may store information associated with the folding angle and/or the folding speed of the electronic device 501. The memory 530 may separately store the information associated with the folding angle and/or the folding speed, on the basis of a type of an application executed by the electronic device 501 or an application execution mode.

According to an embodiment, the flexible display 560 may display information processed by the electronic device 501. The flexible display 560 may be referred to as a display including at least one of a 3D display, a rollable display, or a foldable display. For example, the flexible display 560 may refer to a display, at least a part of has flexibility. The flexible display 560 may be folded or unfolded around a hinge structure included in the electronic device 501. For example, the flexible display 560 may display another screen on each area of the display physically and/or logically divided, under control of the processor 520. The electronic device 501 may be used in various forms, according to the folding angle of the flexible display 560. The use form or the operation mode of the electronic device 501 according to the folding angle of the flexible display 560 will be referenced in detail in a description of FIGS. 6 to 11, which will be described below.

According to an embodiment, the sensor circuit 576 may identify a form of the electronic device 501. The sensor circuit 576 may include various types of sensors (e.g., a hall IC sensor, a digital hall IC sensor, an accelerator sensor, a piezo sensor, a gyro sensor, a time of flight (ToF) sensor, a bending sensor, and/or a 6-axis sensor). The sensor circuit 576 may obtain motion information of the electronic device 501 using at least one of the various types of sensors. For example, the sensor circuit 576 may detect motion (e.g., folding) of the electronic device 501 and may obtain motion information corresponding to the detected motion. For example, the processor 520 may identify a form (or an operation mode) of the electronic device 501 or may identify information (e.g., a folding angle and/or a folding speed) associated with a change (e.g., folding/unfolding) in form of the electronic device 501, based on the motion information obtained using the sensor circuit 576.

According to an embodiment, the camera 580 may include a plurality of cameras (e.g., a front camera and a rear camera). For example, the camera 580 may be disposed on one surface (e.g., a front surface and/or a rear surface) of the electronic device 501. The one surface of the electronic device 501 may include the same surface as a surface with the flexible display 560 or a different surface from the surface with the flexible display 560. Each of the plurality of cameras may be configured to obtain an image with different resolution. For example, the processor 520 may control to display at least one image obtained using the camera 580 on one area of the flexible display 560. The processor 520 may temporarily or permanently store the at least one image in the memory 530.

The components shown in FIG. 5 are illustrative, and embodiments of the disclosure are not limited thereto. For example, the electronic device/apparatus 501 may further include component(s) (e.g., an input module 150 comprising input circuitry, a sound output module 155 comprising output circuitry, and/or a communication module 190 of FIG. 1 comprising communication circuitry) which are not shown in FIG. 5 or may fail to include some of the shown components. For example, the electronic device 501 may further include a housing. The housing may include a hinge structure capable of having flexibility and changing the form of the electronic device 501.

Figure 6:
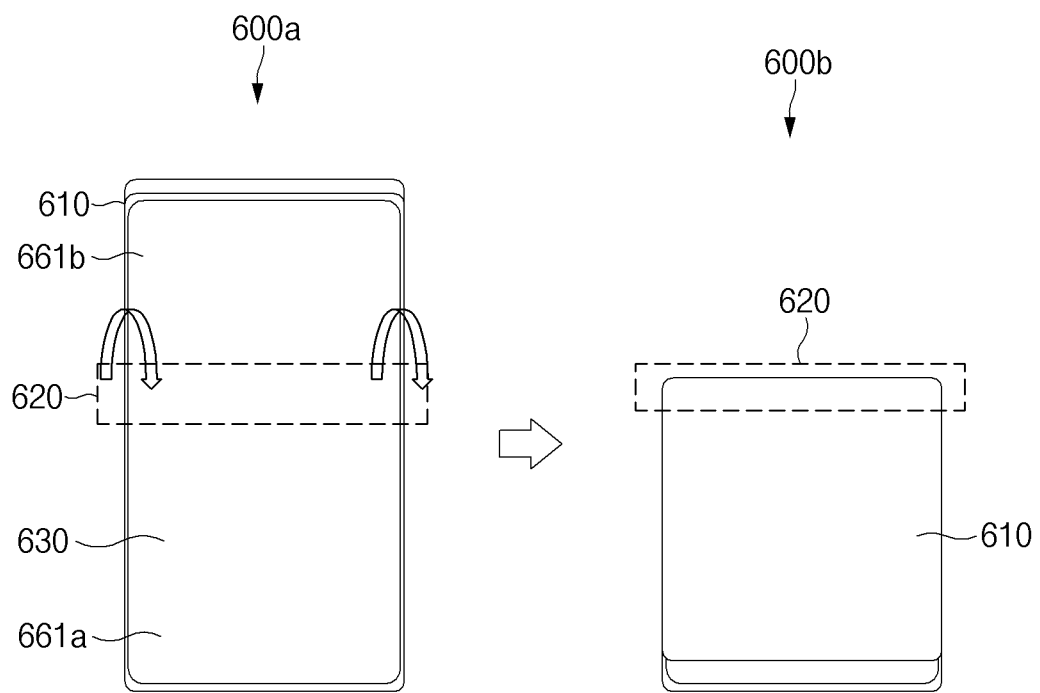
FIG. 6 illustrates an electronic device which varies in form, according to an example embodiment.

FIG. 6 illustrates an electronic device (e.g., an electronic device 101 of FIG. 1) which varies in form, according to as an embodiment.

The form of the electronic device (e.g., the electronic device 101 of FIG. 1) may be physically changed according to folding/unfolding. For example, the electronic device may include a housing 610 and a display 630 (e.g., a display module 160 of FIG. 1 or a flexible display 560 of FIG. 5), which have flexibility in at least a part thereof. The electronic device may be folded (e.g., opened) or unfolded (e.g., closed) around the part having the flexibility of the electronic device. Reference numeral 600*a* may be referred to as an example of a state where the electronic device is unfolded. Reference numeral 600*b* may be referred to as an example of a state where the electronic device is folded. For example, the part where the electronic device has the flexibility may be referred to as a folding part 620. The folding part 620 refers to a part (e.g., a hinge structure) or an area where the form of the electronic device is able to be changed, which is not limited to a specific structure.

According to an embodiment, the electronic device may be folded up and down. For example, the electronic device may include the display 630 and the housing 610, which have flexibility in a part corresponding to the folding part 620. The electronic device may be folded up and down around the folding part 620. It is illustrated that the electronic device is an in-fold electronic device which is folded to the inside of the display 630 in FIG. 6, but embodiments of the disclosure are not limited thereto. For example, the electronic device may be out-folded at the folding part 620 or may be in-folded and out-folded at the folding part 620. For another example, the display 630 is illustrated as one display, but embodiments of the disclosure are not limited thereto. The electronic device may include a plurality of displays divided along the folding part 620. The electronic device may operate by dividing the area of the display 630 with respect to the folding part 620. The housing 610 may also include a plurality of housings divided along the folding part 620. For another example, the electronic device may be a combination of a plurality of electronic devices coupled, directly or indirectly, to be folded around the folding part 620. In this case, the plurality of electronic devices may be coupled to each other by a separate structure (e.g., a housing and/or a hinge).

The change in the physical form of the electronic device illustrated in FIG. 6 is illustrative, and embodiments of the disclosure are not limited thereto. For example, the electronic device may be folded or unfolded around any axis. Furthermore, the form of the electronic device is divided and described into reference numeral 600*a* and reference numeral 600*b* in FIG. 6, but this is illustrative and embodiments of the disclosure are not limited thereto. For example, the electronic device may operate in a half-folding form. The description of the electronic device which operates in the half-folding form may be referenced in detail in a description of FIGS. 7 to 11.

Figure 7:
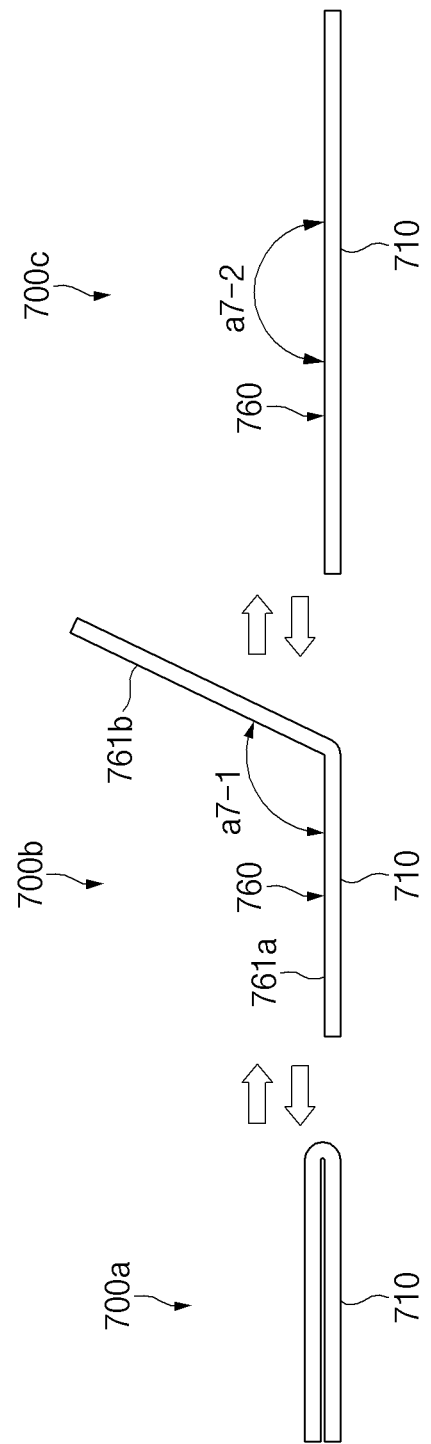
FIG. 7 illustrates an electronic device which varies in form, according to an example embodiment.

FIG. 7 illustrates an electronic device (e.g., an electronic device 101 of FIG. 1 or an electronic device 501 of FIG. 5) which varies in form, according to an embodiment.

Referring to FIG. 7, according to an embodiment, the electronic device may be used in various operation forms (e.g., a folding mode 700a, a table mode 700b, and an unfolding mode 700c) divided with respect to a folding angle.

In the folding mode 700a, the electronic device may be used in the same form as a smartphone in a general bar form. In the folding mode 700a, the folding angle of a housing 710 may be 0 angle. In the folding mode 700a, the electronic device may display various pieces of content on a display 760. For example, the display 760 where the electronic device displays content in the folding mode 700a may be referred to as a separate display physically separated from the above-mentioned flexible display (e.g., a flexible display 560 of FIG. 5).

In the table mode 700b, the electronic device may be used in the same form a laptop, in a state where it is put on a desk or a hand of a user. In the table mode 700b, a folding angle a7-1 of the housing 710 of the electronic device may be 80 degrees to 130 degrees, but embodiments of the disclosure are not limited thereto. For example, the electronic device may operate in the table mode 700b based on a different angle depending on a type of an application to be executed. As an example, while executing a camera application, the electronic device may operate in the table mode 700b when the folding angle a7-1 is 80 degrees to 110 degrees. As another example, while executing another application (e.g., a calendar application (e.g., a calendar 471 of FIG. 4) or an album application (e.g., an album 475 of FIG. 4)) except for the camera application, the electronic device may operate in the table mode 700b when the folding angle a7-1 is 80 degrees to 140 degrees. In the table mode 700b, the electronic device may control to divide an area of a display (e.g., a flexible display 560 of FIG. 5) with respect to a folding part (e.g., a folding part 620 of FIG. 6) and output different content on each area. For example, when executing the camera application, the electronic device may control to display various user interfaces (e.g., a capture button, a stop button, and/or a capture mode change button) for controlling an operation of the camera application on a first area 761a and display at least one image obtained using a camera (e.g., a camera 180 of FIG. 1) on a second area 761b. According to an embodiment, when executing the application based on the table mode 700b, the electronic device may display a screen different from the folding mode 700a and the unfolding mode 700c on the flexible display. For example, when the operation mode changes from the folding mode 700a or the unfolding mode 700c to the table mode 700b (or when the folding angle of the housing 710 changes) while executing a specified application, the electronic device may display a user interface different from a user interface corresponding to the specified application displayed in the folding mode 700a or the unfolding mode 700c on the first area 761a and/or the second area 761b.

In the unfolding mode 700c, the electronic device may be used in the same form as a general tablet. For example, the electronic device may provide content to one area (e.g., the first area 761a and/or the second area 761b) of the flexible display. In the unfolding mode 700c, a folding angle a7-2 of the housing 710 of the electronic device may be 180 degrees.

Figure 8:
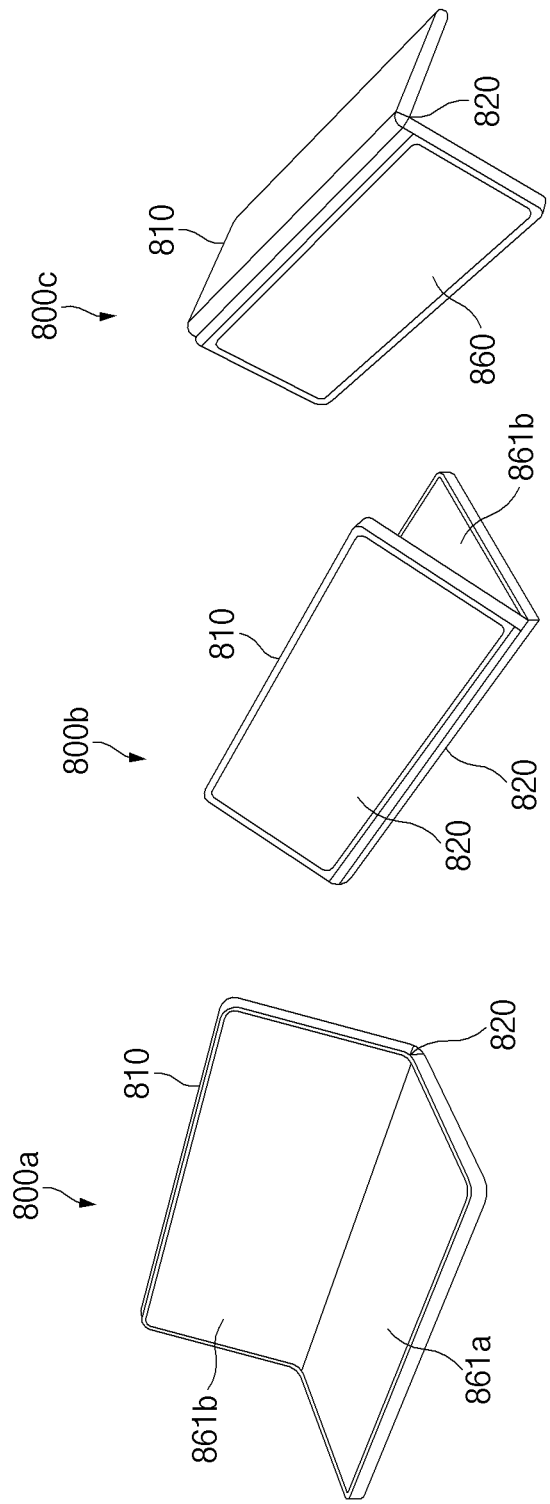
FIG. 8 illustrates an electronic device which varies in form, according to an example embodiment.

FIG. 8 illustrates an electronic device (e.g., an electronic device 101 of FIG. 1 or an electronic device 501 of FIG. 5) which varies in form, according to an embodiment.

Referring to FIG. 8, according to an embodiment, the electronic device may include a folding part 820 (or a hinge structure) (e.g., a folding part 620 of FIG. 6) which is included in at least a part of a housing 810 and has flexibility. The electronic device may be used in various operation forms 800a, 800b, and 800c divided with respect to a folding angle of the folding part 820.

Referring to reference numeral 800a, according to an embodiment, the electronic device may include a flexible display (e.g., a flexible display 560 of FIG. 5) divided with respect to the folding part 820. For example, the electronic device may include a flexible display divided into a first area 861a (e.g., a first area 761a of FIG. 7) and a second area 861b (e.g., a second area 761b of FIG. 7) with respect to the folding part 820. In a form based on reference numeral 800a, the electronic device may display and provide various pieces of content on the first area 861a and/or the second area 861b. The division of the area of the flexible display may be the division of a logical or physical area. In an embodiment, an operation mode of the electronic device based on reference numeral 800a may be referred to as a flex mode. In another embodiment, the operation mode of the electronic device based on reference numeral 800a may be substantially the same operation mode as the table mode 700b of FIG. 7 described above.

Referring to reference numeral 800b and reference numeral 800c, according to an embodiment, the electronic device may further include a separate display 860 (e.g., a display module 160 of FIG. 1) physically separated from the flexible display. For example, in an operation mode according to reference numeral 800b or reference numeral 800c, the electronic device may display and provide various pieces of content on the display 860. As an example, in the operation mode according to reference numeral 800b or reference numeral 800c, the electronic device may display and provide various pieces of content on the display 860 in a state where it is put on a desk or a hand of a user. In an embodiment, the operation mode of the electronic device based on reference numeral 800b may be referred to as a flex cover mode. In an embodiment, the operation mode of the electronic device based on reference numeral 800c may be referred to as a flex tent mode.

Figure 9:
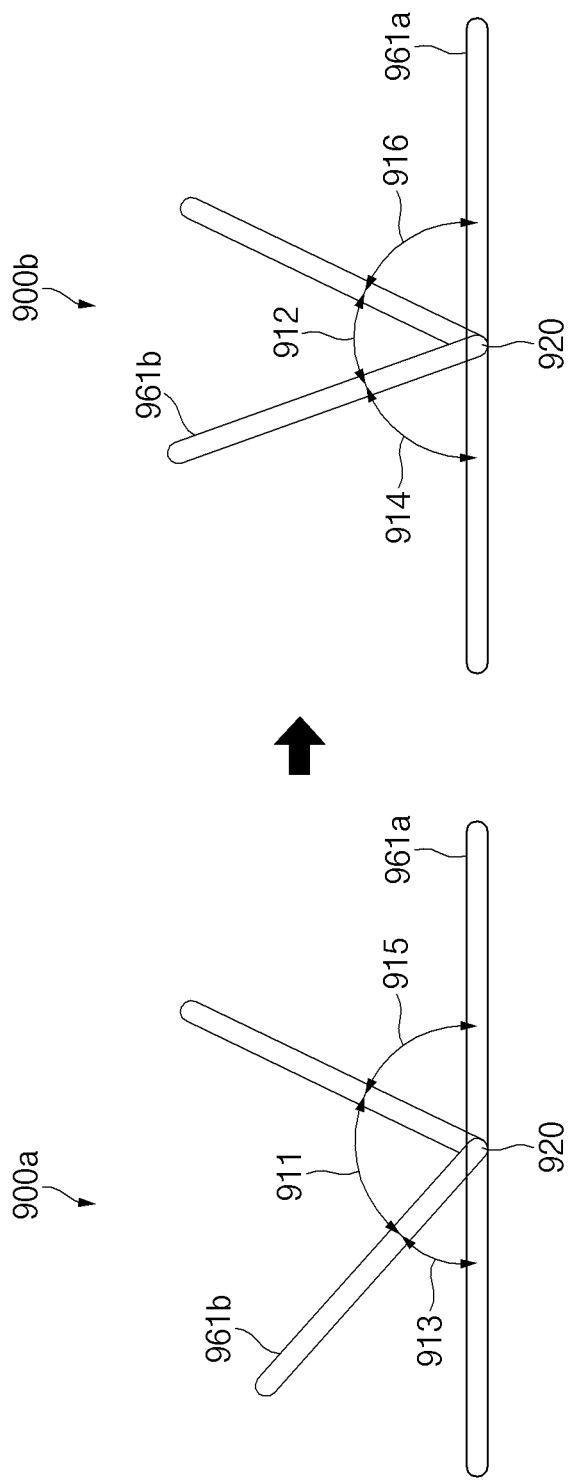
FIG. 9 illustrates an electronic device for changing an operation mode based on a folding angle, according to an example embodiment.
Figure 10:
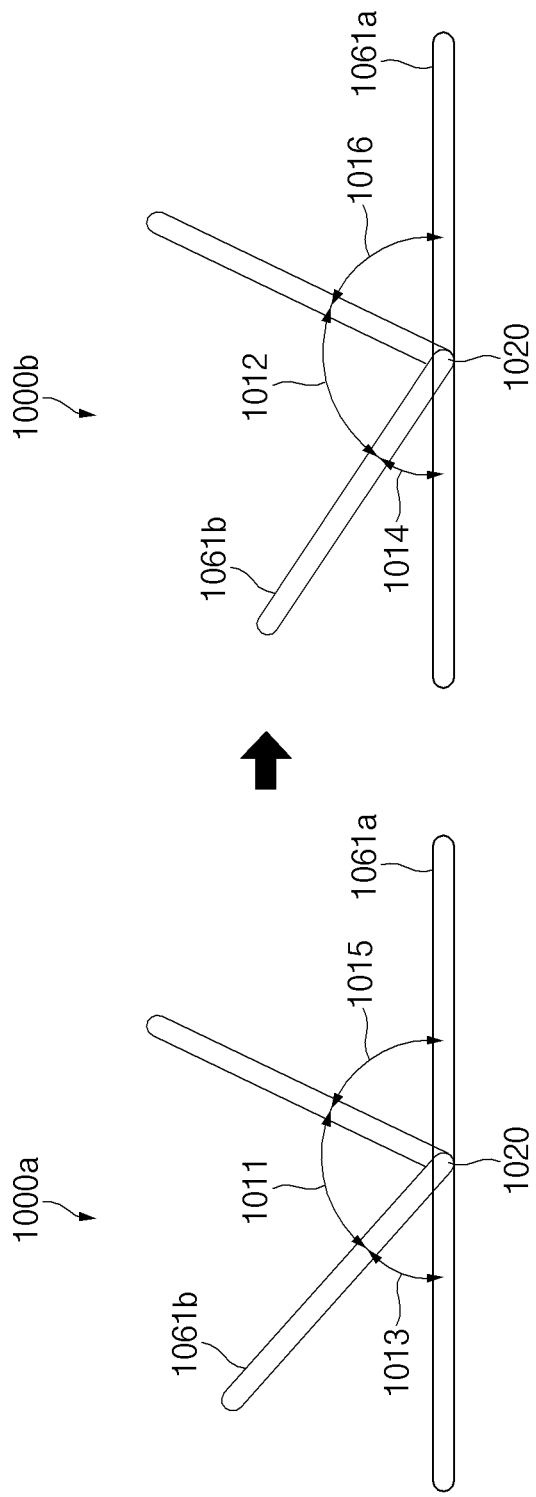
FIG. 10 illustrates an electronic device for changing an operation mode based on a folding angle, according to an example embodiment.

In FIGS. 9 and 10 below, a description will be given of an operation of the electronic device which differently converts a range for switching an execution mode of an application based on a type of the application. For example, FIG. 9 may be a drawing illustrating an electronic device for executing a first application (e.g., a camera 461 of FIG. 4 or a video call application) among a plurality of applications. For another example, FIG. 10 may be a drawing illustrating an electronic device for executing a second application (e.g., an application for an album 475 or a calendar 471 of FIG. 4) among a plurality of applications. According to an embodiment, the electronic device may adaptively change the range for switching the execution mode of the application based on various parameters (e.g., when executing the application based on a specific folding angle, a duration of the specific folding angle, a frequency of execution where the application is executed at the specific folding angle, or an execution mode of the application executed at the specific folding angle). For example, when executing the application based on a specified mode, the electronic device may detect a folding angle on a periodic basis or in real time while the application is executed, may identify a duration of the specific folding angle among the detected folding angles, and may determine whether to change a range for switching the execution mode of the application based on the identified result. As an example, when the duration is greater than a specified time, the electronic device may change the range for switching the execution mode of the application. Thus, the electronic device may identify various folding angles preferred per user in response to a specified execution mode and may intuitively change the range for switching the execution mode of the application.

FIG. 9 illustrates an electronic device for changing an operation mode based on a folding angle, according to an embodiment.

Referring to FIG. 9, according to an embodiment, an electronic device (e.g., an electronic device 101 of FIG. 1) may include a plurality of display areas 961a and 961b divided with respect to a folding part 920 (or a hinge structure) (e.g., folding parts 620 and 820 of FIGS. 6 and 8). For example, the division of the plurality of display areas 961a and 961b may be the division of physical or logical areas of a flexible display (e.g., a display module 160 of FIG. 1) included in the electronic device. The electronic device may display various pieces of content on the first area 961a (e.g., a first area 661a of FIG. 6 or a first area 861a of FIG. 8) and/or the second area 961b (e.g., a second area 661b of FIG. 6 or a second area 861b of FIG. 8) of the flexible display. In an embodiment, the electronic device may identify a folding angle and may variously switch an execution mode of an application (e.g., an application for a camera 461, a calendar 471, or an album 475 of FIG. 4) depending on a range to which the folding angle belongs. For example, the application executed by the electronic device in FIG. 9 may be a first application (e.g., a camera 461 of FIG. 4) configured to use a camera (e.g., a camera module 180 of FIG. 1). According to, the electronic device may detect a folding angle using a sensor circuit (e.g., a sensor module 176 of FIG. 1). For example, the electronic device may determine whether the folding angle belongs to a specified range and may execute the first application based on various execution modes.

Referring to reference numeral 900a, according to an embodiment, when the folding angle belongs to a first range 911, the electronic device may execute the first application based on a first mode. While executing the first application based on the first mode, the electronic device may display at least one image obtained using the camera on the second area 961b of the flexible display. For example, the first range 911 may be referred to as a range where the folding angle corresponds to 80 degrees or 130 degrees, but this is illustrative and embodiments of the disclosure are not limited thereto. In an embodiment, while executing the first application in the first mode, the electronic device may identify a folding angle of the electronic device depending on a first period (e.g., 10 seconds) using the sensor circuit. For example, when the identified folding angle does not belong to the first range 911, the electronic device may switch the execution mode of the first application from the first mode to a second mode. As an example, when it is determined that the identified folding angle belongs to a 1-1st range 913 or a 1-2nd range 915, the electronic device may switch the execution mode of the first application from the first mode to the second mode. The electronic device may change a range for switching the execution mode of the first application from the first range 911 to a second range 912, using at least a portion of the identified folding angle. For example, the electronic device may change the range for switching the execution mode of the first application from the first range 911 to the second range 912, using a maximum or high value among a plurality of folding angles of the electronic device, which are identified while executing the first application based on the first mode. As an example, when the application which is being executed corresponds to the first application, the electronic device may determine a maximum or high value in the second range 912 as a first value (e.g., 110 degrees) less than a first value (e.g., 130 degrees) corresponding to a maximum or high value in the first range 911. The second value may be a value determined based on the maximum or high value among the plurality of folding angles. For example, the electronic device may identify the maximum or high value among the plurality of folding angles and may determine a value obtained by adding a specified value (e.g., 10 degrees) to the maximum or high value (e.g., 100 degrees) as the second value (e.g., 110 degrees). In an embodiment, a minimum or a low value (e.g., 80 degrees) in the first range 911 may be referred to as substantially the same value as a minimum value in the second range 912. In an embodiment, the electronic device may change the range for switching the execution mode of the first application in response to the occurrence of a specified event. For example, the electronic device may detect a folding angle based on a specified period or in real time while executing the first application based on the first mode. The electronic device may compare the folding angle detected based on the specified period or in real time with a predetermined folding angle range (e.g., the first range 911) and may change the range for switching the execution mode of the first application from the first range 911 to the second range 912 when the compared result meets a specified condition. The specified condition may be at least one of a difference between the detected folding angle and the predetermined folding angle range, an amount of the detected folding angle data, a frequency of the detected folding angle, or a duration of the detected folding angle.

According to an embodiment, reference numeral 900b illustrates an operation of the electronic device after changing the range for switching the execution mode of the first application to the second range 912. For example, the electronic device may gradually change the range for switching the execution mode of the first application from the first range 911 to the second range 912. As an example, the electronic device may gradually change a maximum or high value in the range for switching the execution mode of the first application from a maximum or high value (130 degrees) in the first mode 911 to a maximum or high value (e.g., 110 degrees) in the second mode 912. According to an embodiment, when the folding angle belongs to the second range 912, the electronic device may execute the first application based on the first mode. For example, while executing the first application based on the first mode, the electronic device may display at least one image obtained using the camera on the second area 961b of the flexible display. In an embodiment, after changing the range for switching the execution mode of the first application from the first range 911 to the second range 912, the electronic device may monitor a folding angle of the electronic device using the sensor circuit. For example, when the monitored folding angle does not belong to the second range 912, the electronic device may switch the execution mode of the first application from the first mode to the second mode. As an example, when it is determined that the identified folding angle (or monitored folding angle) belongs to a 2-1st range 914 or a 2-2nd range 916, the electronic device may switch the execution mode of the first application from the first mode to the second mode. As another example, when it is determined that the monitored folding angle belongs between a first value and a second value, the electronic device may display guide information associated with a folding angle for switching the execution mode of the first application on one area of the flexible display. A description of the guide information displayed by the electronic device may be referenced in detail in a description of FIG. 11, which will be described below.

FIG. 10 illustrates an electronic device for changing an operation mode based on a folding angle, according to an embodiment.

Referring to FIG. 10, according to an embodiment, an electronic device (e.g., an electronic device 101 of FIG. 1) may include a plurality of display areas 1061*a* and 1061*b* divided with respect to a folding part 1020 (or a hinge structure) (e.g., folding parts 620 and 820 of FIGS. 6 and 8). The electronic device may display various pieces of content on the first area 1061*a* (e.g., a first area 661*a* of FIG. 6 or a first area 861*a* of FIG. 8) and/or the second area 1061*b* (e.g., a second area 661*b* of FIG. 6 or a second area 861*b* of FIG. 8) of a flexible display. For example, the application executed by the electronic device in FIG. 10 may be a second application (e.g., a calendar 471 or an album 475 of FIG. 4) configured not to use a camera (e.g., a camera module 180 of FIG. 1). In an embodiment, the electronic device may detect a folding angle using a sensor circuit (e.g., a sensor module 176 of FIG. 1). For example, the electronic device may determine whether the folding angle belongs to a specified range and may execute the second application based on various execution modes. A description duplicated with FIG. 9 in the description of FIG. 10 may be replaced with the above-mentioned description of FIG. 9.

Referring to reference numeral 1000*a*, according to an embodiment, when the folding angle belongs to a first range 1011 (e.g., a first range 911 of FIG. 9), the electronic device may execute the second application based on a first mode. In an embodiment, while executing the second application in the first mode, the electronic device may identify a folding angle of the electronic device depending on a first period (e.g., 10 seconds) using the sensor circuit. For example, when the identified folding angle does not belong to the first range 1011, the electronic device may switch an execution mode of the second application from the first mode to a second mode. As an example, when it is determined that the identified folding angle belongs to a 1-1st range 1013 (e.g., a 1-1st range 913 of FIG. 9) or a 1-2nd range 1015 (e.g., 1-2nd range 915 of FIG. 9), the electronic device may switch the execution mode of the application (e.g., the second application) from the first mode to the second mode. The electronic device may change a range for switching the execution mode of the application (e.g., the second application) from the first range 1011 to a second range 1012, using at least a portion of the identified folding angle. For example, the electronic device may change the range for switching the execution mode of the second application from the first range 1011 to the second range 1012, using a maximum value among a plurality of folding angles of the electronic device, which are identified while executing the second application based on the first mode. As an example, when the application which is being executed corresponds to the second application, the electronic device may determine a maximum value in the second range 1012 as a third value (e.g., 140 degrees) greater than a first value (e.g., 130 degrees) corresponding to a maximum value in the first range 1011. The third value may be a value determined based on the maximum value among the plurality of folding angles. For example, the electronic device may identify the maximum value among the plurality of folding angles and may determine a value obtained by adding a specified value (e.g., 10 degrees) to the maximum value (e.g., 130 degrees) as the third value (e.g., 140 degrees). In an embodiment, a minimum or a low value (e.g., 80 degrees) in the first range 1011 may be referred to as substantially the same value as a minimum or a low value in the second range 1012. In an embodiment, the electronic device may change the range for switching the execution mode of the second application in response to the occurrence of a specified event. For example, the electronic device may detect a folding angle based on a specified period or in real time while executing the second application based on the first mode. The electronic device may compare the folding angle detected based on the specified period or in real time with a predetermined folding angle range (e.g., the first range 1011) and may change the range for switching the execution mode of the second application from the first range 1011 to the second range 1012 when the compared result meets a specified condition. The specified condition may be at least one of a difference between the detected folding angle and the predetermined folding angle range, an amount of the detected folding angle data, a frequency of the detected folding angle, or a duration of the detected folding angle.

The second range 1012 of FIG. 10 may have a threshold different from the second range 912 described above in the description of FIG. 9. For example, the electronic device may differently change a range for switching the execution mode of the application, depending on a type of the application. For example, the second range 1012 of FIG. 10 may be referred to as the case where the folding angle of the electronic device is 80 degrees to 140 degrees. In other words, a maximum value (e.g., 140 degrees) in the second range 1012 of FIG. 10 may have a value greater than a maximum value (e.g., 110 degrees) in a second range 912 of FIG. 9.

According to an embodiment, reference numeral 1000*b* illustrates an operation of the electronic device after changing the range for switching the execution mode of the second application to the second range 1012. For example, the electronic device may gradually change the range for switching the execution mode of the second application from the first range 1011 to the second range 1012. As an example, the electronic device may gradually change a maximum value in the range for switching the execution mode of the second application from a maximum value (e.g., 130 degrees) in the first mode 1011 to a maximum value (e.g., 140 degrees) in the second mode 1012. According to an embodiment, when the folding angle belongs to the second range 1012, the electronic device may execute the second application based on the first mode. In an embodiment, after changing the range for switching the execution mode of the application (e.g., the second application) from the first range 1011 to the second range 1012, the electronic device may monitor a folding angle of the electronic device using the sensor circuit. For example, when the monitored folding angle does not belong to the second range 1012, the electronic device may switch the execution mode of the second application from the first mode to the second mode. As an example, when it is determined that the identified folding angle (or monitored folding angle) belongs to a 2-1st range 1014 or a 2-2nd range 1016, the electronic device may switch the execution mode of the second application from the first mode to the second mode. As another example, when it is determined that the monitored folding angle belongs between a first value and a third value, the electronic device may display guide information associated with a folding angle for switching the execution mode of the second application on one area of the flexible display. A description of the guide information displayed by the electronic device may be referenced in detail in a description of FIG. 11, which will be described below.

The contents where the electronic device changes the folding angle for switching the execution mode of the application based on the folding angle are described in FIGS. 9 and 10, but embodiments of the disclosure are not limited thereto. For example, the electronic device may switch the execution mode of the application based on a folding speed obtained via the sensor circuit.

According to an embodiment, while executing the application based on the second mode, the electronic device may identify a folding angle of the electronic device depending on a second period (e.g., 0.1 seconds), using the sensor circuit. The electronic device may calculate a folding speed of a foldable electronic device using at least a portion of the identified folding angle. For example, the at least a portion of the identified folding angle may refer to a folding angle identified within a specified interval (e.g., an interval before 1 second from a time point when the folding angle is lastly identified) in the identified folding angle. For example, the folding speed may be referred to as a speed at which at least a part of a housing of the electronic device (e.g., a part corresponding to a first area 1061*a* of FIG. 10) is unfolded. As an example, the electronic device may detect a folding speed of at least a part of the housing of the electronic device using the sensor circuit (e.g., an accelerator sensor). As another example, the folding speed may be defined as an angular speed calculated using a folding angle and a time, which are monitored by the electronic device. As an example, the electronic device may monitor a folding angle of the electronic device using the sensor circuit and may divide the monitored folding angle by the monitored time to calculate a folding speed of the electronic device.

According to an embodiment, when the calculated folding speed is greater than a predetermined speed, the electronic device may generate a reference speed to switch the execution mode of the application. For example, the predetermined speed may be a value set in a stage of producing the electronic device and may be a setting value changed by manipulation of a user. In an embodiment, while executing the application based on the first mode, the electronic device may monitor a folding speed of the electronic device using the sensor circuit. For example, when the monitored folding speed is greater than the generated reference speed, the electronic device may switch the execution mode of the application from the first mode to the second mode. When switching the execution mode of the application from the first mode to the second mode based on the folding speed, the electronic device may display information associated with switching the execution mode of the application on one area of the flexible display. For example, the electronic device may display guide information that the execution mode of the application is switched based on the folding speed, on one area of the flexible display.

Figure 11:
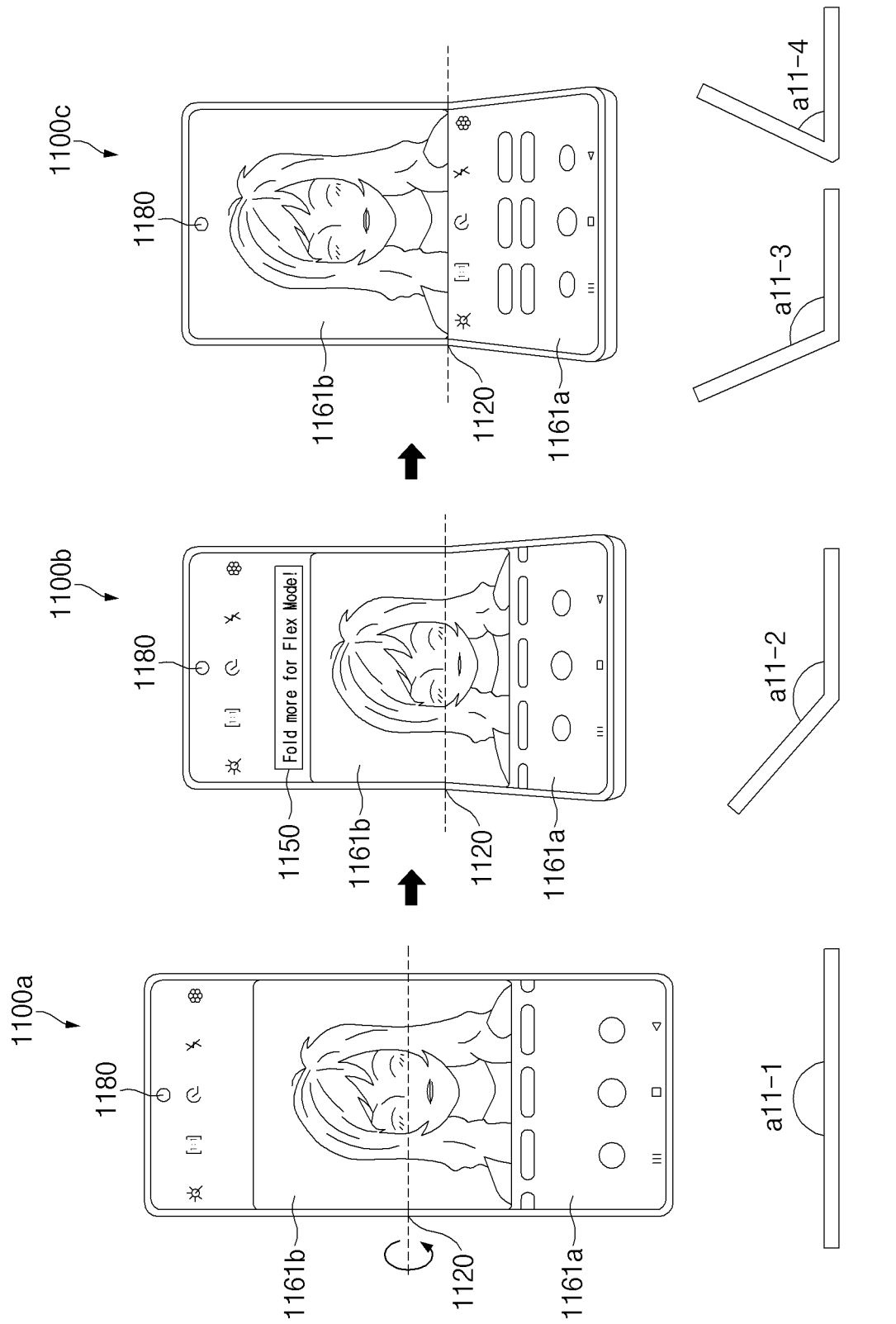
FIG. 11 illustrates an electronic device for changing an operation mode based on a folding angle, according to an example embodiment.

FIG. 11 illustrates an electronic device for changing an operation mode based on a folding angle, according to an embodiment.

Referring to FIG. 11, according to an embodiment, an electronic device (e.g., an electronic device 101 of FIG. 1) may include a plurality of display areas 1161*a* and 1161*b* divided with respect to a folding part 1120 (or a hinge structure) (e.g., folding parts 620 and 820 of FIGS. 6 and 8). For example, an application executed by the electronic device in FIG. 11 may be a first application (e.g., a camera 461 of FIG. 4) configured to use a camera 1180 (e.g., a camera module 180 of FIG. 1), but embodiments of the disclosure are not limited thereto. In an embodiment, an execution operation of the application of the electronic device shown in FIG. 11 may correspond to an operation performed after the electronic device changes a range for switching an execution mode of an application in FIGS. 9 and 10.

Referring to reference numeral 1100*a*, according to an embodiment, the electronic device may operate in a state where it is folded at a first angle a11-1 (e.g., 180 degrees). The electronic device may detect that the folding angle is the first angle a11-1 using a sensor circuit. The electronic device may determine whether the identified first angle a11-1 belongs to a specified range (e.g., a second range 912 of FIG. 9) (e.g., 80 degrees to 110 degrees). For example, when the folding angle does not belong to the specified range, the electronic device may execute the execution mode of the application in the second mode. The electronic device according to reference numeral 1100*a* may determine that the first angle a11-1 is not included in the specified range and may execute and display the application based on the second mode on a flexible display. For example, the electronic device may display at least one image obtained using the camera 1180 on a portion of a first area 1161*a* of the flexible display and a portion of a second area 1161*b* of the flexible display.

Referring to reference numeral 1100*b*, according to an embodiment, the electronic device may operate in a state where it is folded at a second angle a11-2 (e.g., 130 degrees). The electronic device may detect that the folding angle is the second angle a11-2 using a sensor circuit. The electronic device may determine whether the identified second angle (or detected second angle) a11-2 belongs to a specified range. The folding angle of the electronic device according to reference numeral 1100*b* may belong to between a maximum value of a first range (e.g., a first range 911 of FIG. 9) before changing a range for switching the execution mode of the application and a maximum value in a second range (e.g., a second range 912 of FIG. 9) after changing the range for switching the execution mode of the application. For example, the folding angle of the electronic device may belong to a first value which is the maximum value in the first range and a second value which is the maximum value in the second range. In an embodiment, the electronic device may monitor a folding angle using the sensor circuit while executing the application based on the second mode and may display a user interface 1150 including guide information associated with a folding angle for switching the execution mode of the application on one area of the flexible display, when the monitored folding angle belongs the first value and the second value. For example, when the folding angle corresponds to a value less than a current state, the electronic device may display the user interface 1150 including guide information that it is able to change the execution mode of the application on the second area 1161*b* of the flexible display.

Referring to reference numeral 1100*c*, according to an embodiment, the electronic device may operate in a state where it is folded at a folding angle which is an angle between a third angle a11-3 (e.g., 110 degrees) and a fourth angle a11-4 (e.g., 80 degrees). The electronic device may detect that the folding angle is the angle between the third angle a11-3 and the fourth angle a11-4 using the sensor circuit. The folding angle of the electronic device according to reference numeral 1100*c* may belong to the second range which is after changing the range for switching the execution mode of the application. When it is determined that the folding angle is included in the second range, the electronic device may switch the execution mode of the application from the second mode to a first mode. For example, while executing the first application based on the first mode, the electronic device may display at least one image obtained using the camera 1180 on the second area 1161*b* and may fail to display the at least one image on the first area 1161*a*.

Figure 12:
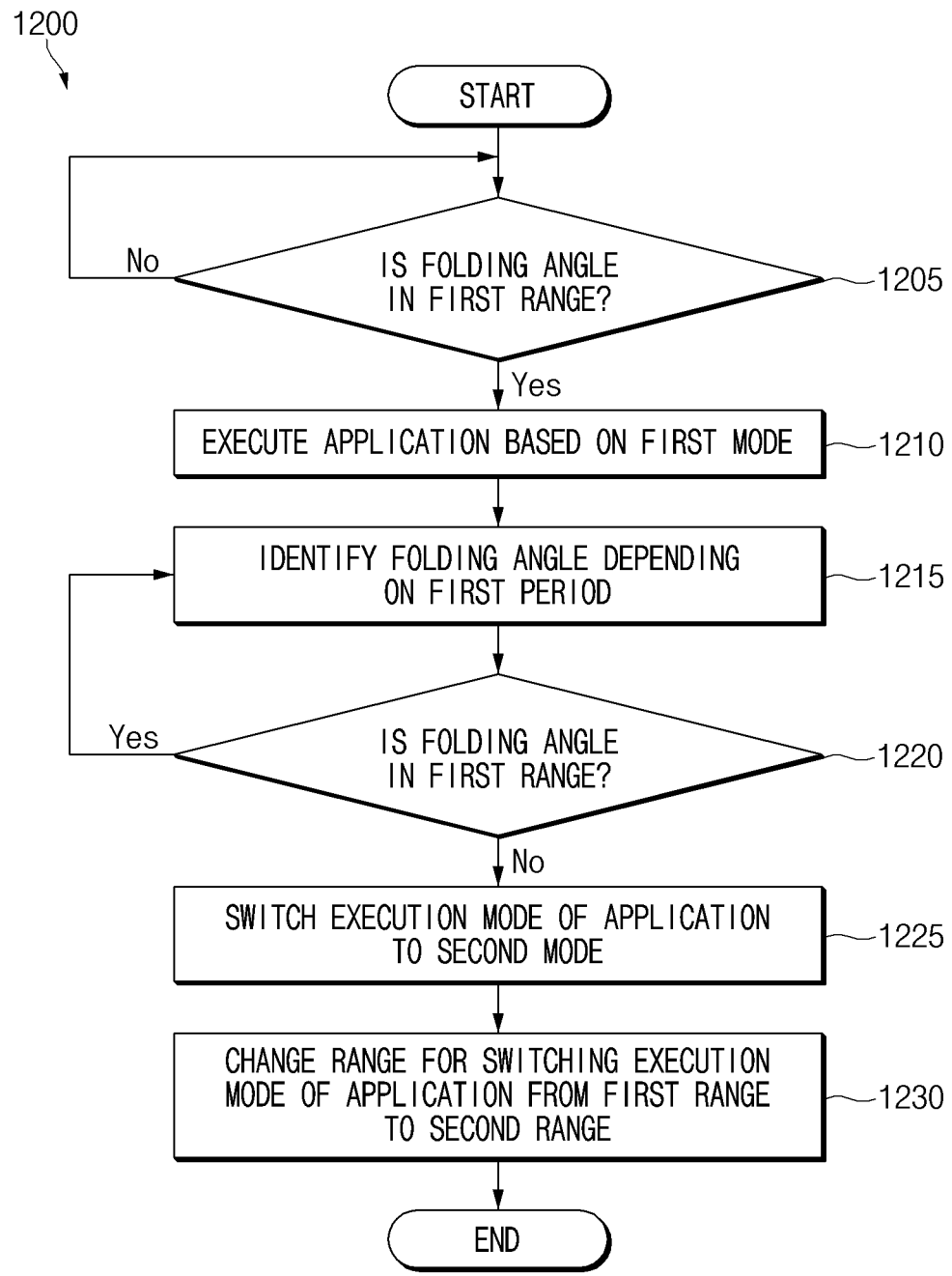
FIG. 12 illustrates an operational flowchart of an electronic device, according to an example embodiment.

FIG. 12 illustrates an operational flowchart 1200 of an electronic device, according to an embodiment.

According to an embodiment, the electronic device (e.g., an electronic device 101 of FIG. 1) may perform operations disclosed in FIG. 12. For example, a processor (e.g., a processor 120 of FIG. 1) of the electronic device may be configured to perform operations of FIG. 12 when executing instructions stored in a memory (e.g., a memory 130 of FIG. 1). In a description of FIG. 12, which will be described below, the electronic device may change a range for switching an execution mode of an application based on a folding angle from a predetermined range (e.g., a first range 911 or 1011 of FIG. 9 or 10) to a new range (e.g., a second range 912 or 1012 of FIG. 9 or 10).

In operation 1205, the electronic device may identify whether the folding angle belongs a first range (e.g., the first range 911 or 1011 of FIG. 9 or 10) (e.g., 80 degrees to 130 degrees). For example, the electronic device may identify a folding angle of the electronic device using a sensor circuit (e.g., a sensor module 176 of FIG. 1). The electronic device may execute an application based on another execution mode as a range to which the folding angle belongs is changed.

When it is determined that the folding angle belongs to the first range (e.g., operation 1205—Yes) in operation 1205, the electronic device may execute the application based on a first mode.

When it is determined that the folding angle does not belong to the first range (e.g., operation 1205—No) in operation 1205, the electronic device may continue monitoring a folding angle.

In operation 1210, the electronic device may execute the application in the first mode. For example, the application executed by the electronic device may be divided into a first application (e.g., a camera 461 of FIG. 4) and a second application (e.g., a calendar 471 or an album 475 of FIG. 4) depending to whether it is configured to use a camera. The electronic device may separately identify a type of an application which is being executed. For example, while executing the first application based on the first mode, the electronic device may display at least one image obtained using the camera (e.g., a camera module 180 of FIG. 1) on a second area (e.g., a second area 1161*b* of FIG. 11) on a flexible display (e.g., a display module 160 of FIG. 1).

In operation 1215, the electronic device may identify a folding angle based on a first period. For example, the first period may be referred to as 10 seconds, but this is illustrative and embodiments of the disclosure are not limited thereto. In an embodiment, the electronic device may identify an amount of change in the folding angle of the electronic device on the basis of a specified time point.

In operation 1220, the electronic device may determine whether the identified folding angle belongs to the first range. For example, the electronic device may determine whether the folding angle identified based on the first period belongs to the first range.

When it is determined that the folding angle belongs to the first range (e.g., operation 1220—Yes) in operation 1220, the electronic device may repeatedly perform operation 1215.

When it is determined that the folding angle does not belong to the first range (e.g., operation 1220—No) in operation 1220, the electronic device may perform operation 1225.

In operation 1225, the electronic device may switch an execution mode of the application to a second mode. For example, the electronic device may switch the execution mode of the application which is being executed in the first mode to the second mode. The criterion for dividing the execution mode of the application, which is divided into the first mode and the second mode, may be referred to as dividing an area of the flexible display into a plurality of areas and displaying another screen for each area, but this is illustrative and embodiments of the disclosure are not limited thereto. Furthermore, it is described that the execution mode of the application is limited to the first mode and the second mode, but the execution mode of the application may further include at least one execution mode.

In operation 1230, the electronic device may change a range for switching the execution mode of the application from the first range to a second range (e.g., a second range 912 of FIG. 9 or a second range 1012 of FIG. 10). In an embodiment, the electronic device may change the range from the first range to the second range using at least a portion of the identified folding angle. For example, the electronic device may change the range for switching the execution mode of the application from the first range to the second range, using a maximum value among folding angles identified according to the first period while executing the application, based on the first mode. The first range may include a first value (e.g., 130 degrees) corresponding to the maximum value. For example, when the application which is being executed by the electronic device is a first application configured to use the camera, the second range may correspond to the maximum value and may include a second value (e.g., 110 degrees) less than the first value. For another example, when the application which is being executed by the electronic device is a second application configured not to use the camera, the second range may correspond to the maximum value and may include a third value (e.g., 140 degrees) greater than the first value. In other words, the electronic device may set and change the range for switching the execution mode of the application which is being executed to another range depending on a type of the application.

Figure 13:
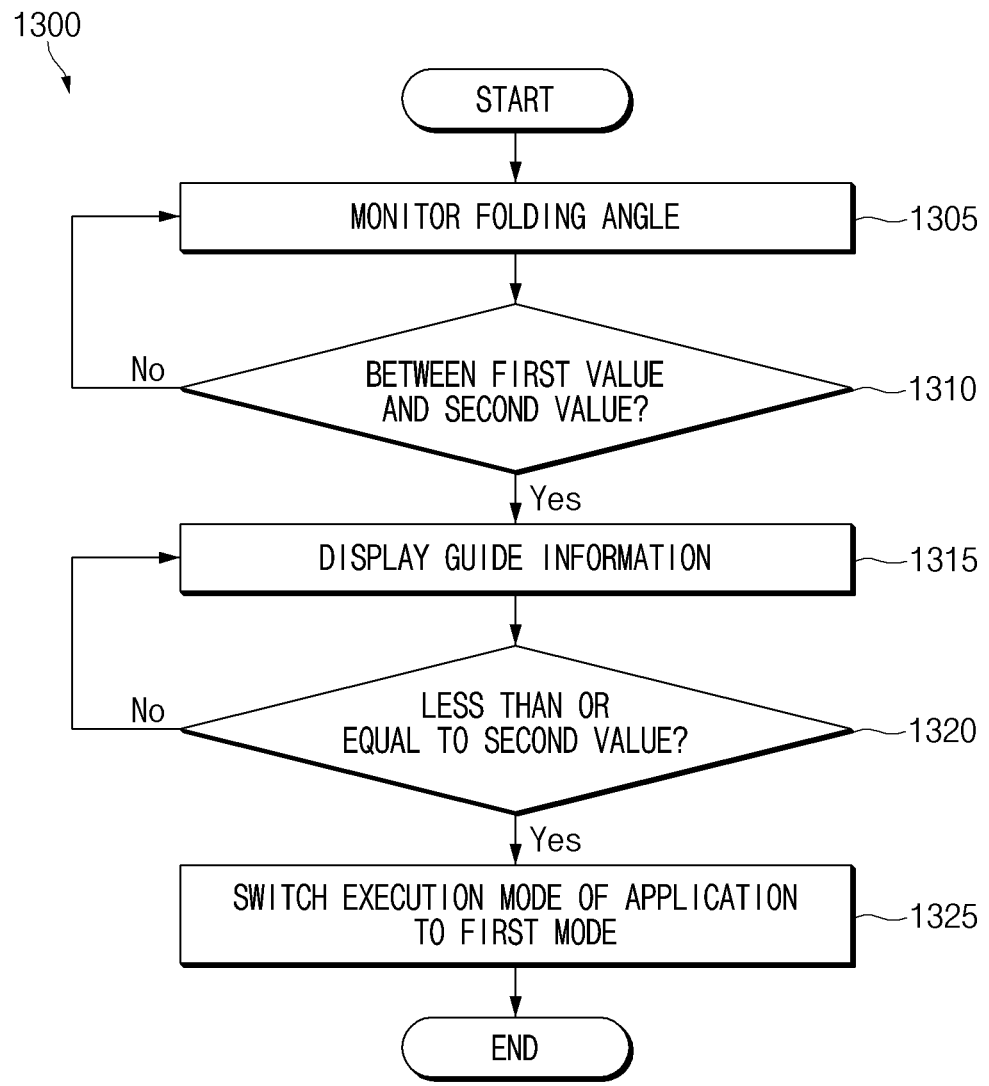
FIG. 13 illustrates an operational flowchart of an electronic device, according to an example embodiment.

FIG. 13 illustrates an operational flowchart 1300 of an electronic device, according to an embodiment.

According to an embodiment, the electronic device (e.g., an electronic device 101 of FIG. 1) may perform operations disclosed in FIG. 13. For example, a processor (e.g., a processor 120 of FIG. 1) of the electronic device may be configured to perform operations of FIG. 13 when executing instructions stored in a memory (e.g., a memory 130 of FIG. 1). In a description of FIG. 13, the application executed by the electronic device may be a first application (e.g., a camera 461 of FIG. 4) configured to use a camera. An operation of the electronic device according to FIG. 13 may be referred to as an operation after the operation of FIG. 12 is performed.

In operation 1305, the electronic device may monitor a folding angle. For example, after changing the range for switching the execution mode of the application to the second range in the above-mentioned description of FIG. 12, the electronic device may monitor the folding angle of the electronic device in real time or based on a specified period using a sensor circuit (e.g., a sensor module 176 of FIG. 1).

In operation 1310, the electronic device may determine whether the monitored folding angle belongs to between a first value and a second value. The first value may correspond to a maximum value in a first range (e.g., a first range 911 of FIG. 9). The second value may correspond to a maximum value in a second range (e.g., a second range 912 of FIG. 9). For example, the second value may be referred to as a value less than the first value, but embodiments of the disclosure are not limited thereto.

When it is determined that the monitored folding angle belongs to between the first value and the second value (operation 1310—Yes) in operation 1310, the electronic device may perform operation 1315.

When it is determined that the monitored folding angle does not belong to between the first value and the second value (operation 1310—No) in operation 1310, the electronic device may repeatedly perform operation 1305.

In operation 1315, the electronic device may display guide information on one area of a flexible display (e.g., a display module 160 of FIG. 1). For example, when the monitored folding angle belongs to between the first value and the second value, the electronic device may display a user interface (e.g., a user interface 1150 of FIG. 11) including guide information associated with a folding angle of the electronic device for switching the execution mode of the application on one area (e.g., a second area 1161*b* of FIG. 11) of the flexible display. In an embodiment, the electronic device may further display a user interface including information that a range of the folding angle for switching the execution mode of the application changes on one area of the flexible display.

In operation 1320, the electronic device may determine whether the folding angle is less than or equal to the second value. For example, after displaying the guide information, the electronic device may continuously monitor a folding angle of the electronic device. The electronic device may identify whether the monitored folding angle is less than or equal to the second value in real time or depending on a specified period. It is described that the electronic device determines whether the folding angle is less than or equal to the second value in operation 1320, but an embodiment of the disclosure is not limited thereto. For example, the electronic device may determine whether the folding angle is less than or equal to the second value and is greater than or equal to a third value. For example, the third value may be referred to as the fourth angle a11-4 (e.g., 80 degrees) of FIG. 11, which is described above.

When it is determined that the monitored folding angle is less than or equal to the second value (e.g., operation 1320—Yes) in operation 1320, the electronic device may perform operation 1325. In an embodiment, when it is determined that the monitored folding angle is less than or equal to the second value and is greater than or equal to the third value, the electronic device may perform operation 1325.

When it is determined that the monitored folding angle is greater than the second value (operation 1320—No) in operation 1320, the electronic device may repeatedly perform operation 1315.

In operation 1325, the electronic device may switch an execution mode of the application to a first mode. For example, as the range for switching the execution mode of the application changes to a second range, the electronic device may switch the execution mode of the application to the first mode when the folding angle is less than or equal to the second value which is a maximum or a high value in the second range. It is described that the electronic device switches the execution mode of the application to the first mode when the folding angle is less than or equal to the second value in operation 1325, but the electronic device may switch the execution mode of the application from the second mode to the first mode only when the folding angle is less than or equal to the second value and is greater than or equal to the third value. For example, the third value may be referred to as the fourth angle a11-4 (e.g., 80 degrees) of FIG. 11, which is described above. For example, while executing the application based on the first mode, the electronic device may display at least one image obtained using a camera (e.g., a camera module 180 of FIG. 1, comprising a camera) on a specified area (e.g., a second area 1161*b* of FIG. 11) of the flexible display. For example, the specified area may correspond to an area (e.g., the second area 1161*b*) including the camera which obtains the at least one image among a plurality of areas (e.g., the first area 1161*a* and the second area 1161*b* of FIG. 11) where the flexible display is divided based on a folding part (e.g., a folding part 1120 of FIG. 11).

Figure 14:
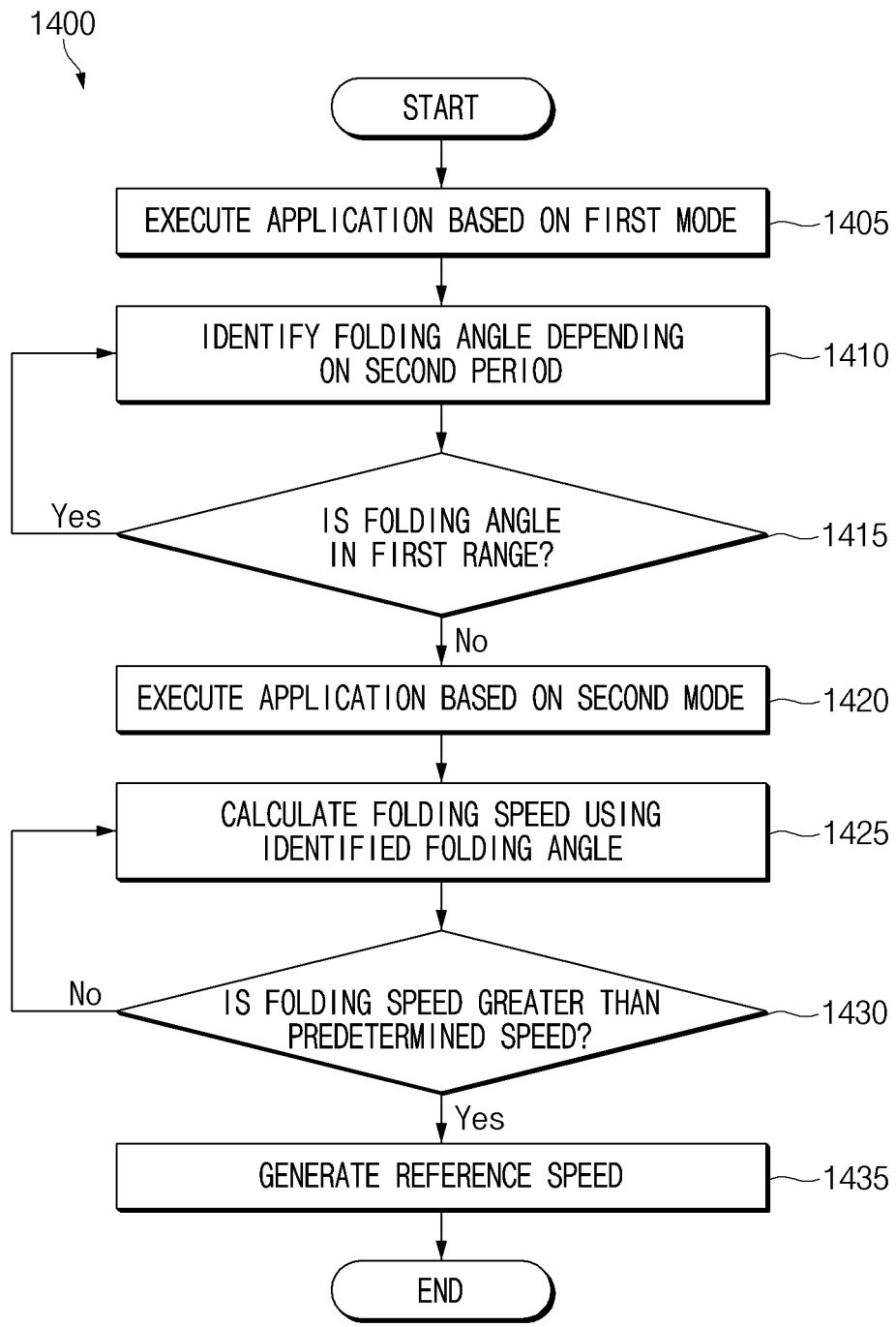
FIG. 14 illustrates an operational flowchart of an electronic device, according to an example embodiment.

FIG. 14 illustrates an operational flowchart 1400 of an electronic device, according to an embodiment.

According to an embodiment, the electronic device (e.g., an electronic device 101 of FIG. 1) may perform operations disclosed in FIG. 14. For example, a processor (e.g., a processor 120 of FIG. 1) of the electronic device may be configured to perform operations of FIG. 14 when executing instructions stored in a memory (e.g., a memory 130 of FIG. 1). In a description of FIG. 14, which will be described below, the electronic device may generate a reference value (or a reference speed) of a folding speed for switching an execution mode of an application based on the folding speed.

In operation 1405, the electronic device may execute the application based on a first mode. A description of an operation of the electronic device which executes the application based on the first mode may be replaced with the description of FIGS. 12 and 13, which is described above.

In operation 1410, the electronic device may identify a folding angle depending on a second period (e.g., 0.1 seconds). For example, the electronic device may identify a folding angle depending on a second period, using a sensor circuit (e.g., a sensor module 176 of FIG. 1).

In operation 1415, the electronic device may determine whether the identified folding angle belongs a first range (e.g., a first ranges 911 or 1011 of FIG. 9 or 10). For example, the electronic device may determine whether the folding angle identified based on the second period belongs to the first range.

When it is determined that the folding angle belongs to the first range (e.g., operation 1415—Yes) in operation 1415, the electronic device may repeatedly perform operation 1410.

When it is determined that the folding angle does not belong to the first range (e.g., operation 1415—No) in operation 1415, the electronic device may perform operation 1420.

In operation 1420, the electronic device may execute the application based on a second mode. In other words, the electronic device may switch the execution mode from the first mode to the second mode to execute the application.

In operation 1425, the electronic device may calculate a folding speed using the identified folding angle. For example, the electronic device may calculate the folding speed of the electronic device using at least a portion of the folding angle identified based on the second period in operation 1410, For example, the folding speed may be referred to as a speed at which at least a part (e.g., a part corresponding to a first area 961*a* of FIG. 9) of a housing of the electronic device is unfolded. As an example, the electronic device may detect a folding speed of at least a part of the housing of the electronic device using a sensor circuit (e.g., an accelerator sensor). As another example, the folding speed may be defined as an angular speed calculated using a folding angle and a time, which are monitored by the electronic device. As an example, the electronic device may monitor a folding angle of the electronic device using the sensor circuit and may divide the monitored folding angle by the monitored time to calculate a folding speed of the electronic device.

In operation 1430, the electronic device may determine whether the folding speed is greater than a predetermined speed. For example, the predetermined speed may be a value set in a stage of producing the electronic device and may be a setting value changed by manipulation of a user.

When it is determined that the folding speed is greater than the predetermined speed (e.g., operation 1430—Yes) in operation 1430, the electronic device may perform operation 1435.

When it is determined that the folding speed is not greater than the predetermined speed (e.g., operation 1430—No) in operation 1430, the electronic device may repeatedly perform operation 1425.

In operation 1435, the electronic device may generate a reference speed. For example, when the folding speed calculated in operation 1425 is greater than the predetermined speed, the electronic device may generate the reference speed for switching the execution mode of the application. For example, after generating the reference speed, when it is determined that the folding speed identified in real time or according to a specified period is greater than the reference speed, the electronic device may switch the execution mode of the application regardless of the folding angle.

Figure 15:
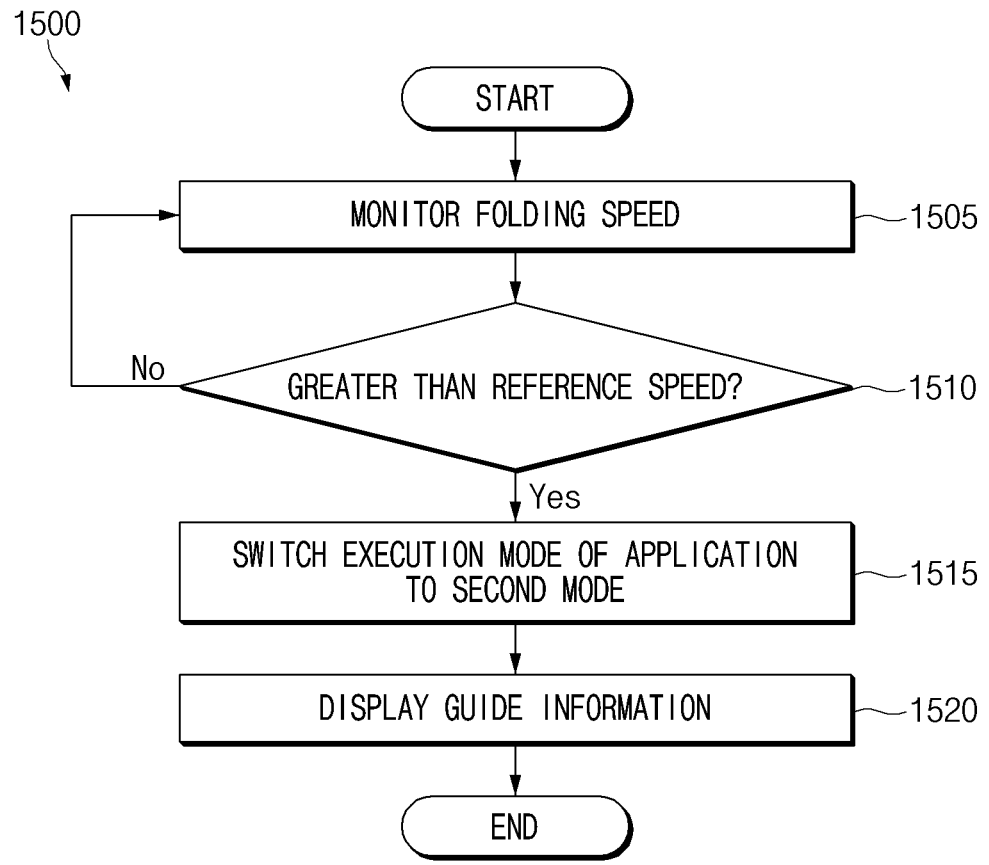
FIG. 15 illustrates an operational flowchart of an electronic device, according to an example embodiment.

FIG. 15 illustrates an operational flowchart 1500 of an electronic device, according to an embodiment.

According to an embodiment, the electronic device (e.g., an electronic device 101 of FIG. 1) may perform operations disclosed in FIG. 15. For example, a processor (e.g., a processor 120 of FIG. 1) of the electronic device may be configured to perform operations of FIG. 15 when executing instructions stored in a memory (e.g., a memory 130 of FIG. 1). An operation of the electronic device according to FIG. 15 may be referred to as an operation after the operation of FIG. 14 is performed.

In operation 1505, the electronic device may monitor a folding speed. For example, the electronic device may monitor the folding speed in real time or depending on a specified period. The description of the folding speed and the operation of monitoring the folding speed may be replaced with the description of FIG. 14, which is described above.

In operation 1510, the electronic device may determine whether the monitored folding speed is greater than a reference speed. For example, the reference speed may be a reference value generated by the electronic device according to the description of FIG. 14, which is described above.

When it is determined that the folding speed is greater than the predetermined speed (e.g., operation 1510—Yes) in operation 1510, the electronic device may perform operation 1515.

When it is determined that the folding speed is not greater than the predetermined speed (e.g., operation 1510—No) in operation 1510, the electronic device may repeatedly perform operation 1505.

In operation 1515, the electronic device may switch an execution mode of an application from a first mode to a second mode. For example, in the state where the application is executed in the first mode, when it is determined that the folding speed is greater than the reference speed, the electronic device may switch the execution mode to the second mode and may continue executing the application.

In operation 1520, the electronic device may display guide information on one area of a flexible display (e.g., a display module 160 of FIG. 1). For example, the electronic device may display a user interface including information that the execution mode of the application is switched based on the folding speed, one area of the flexible display.

Figure 16:
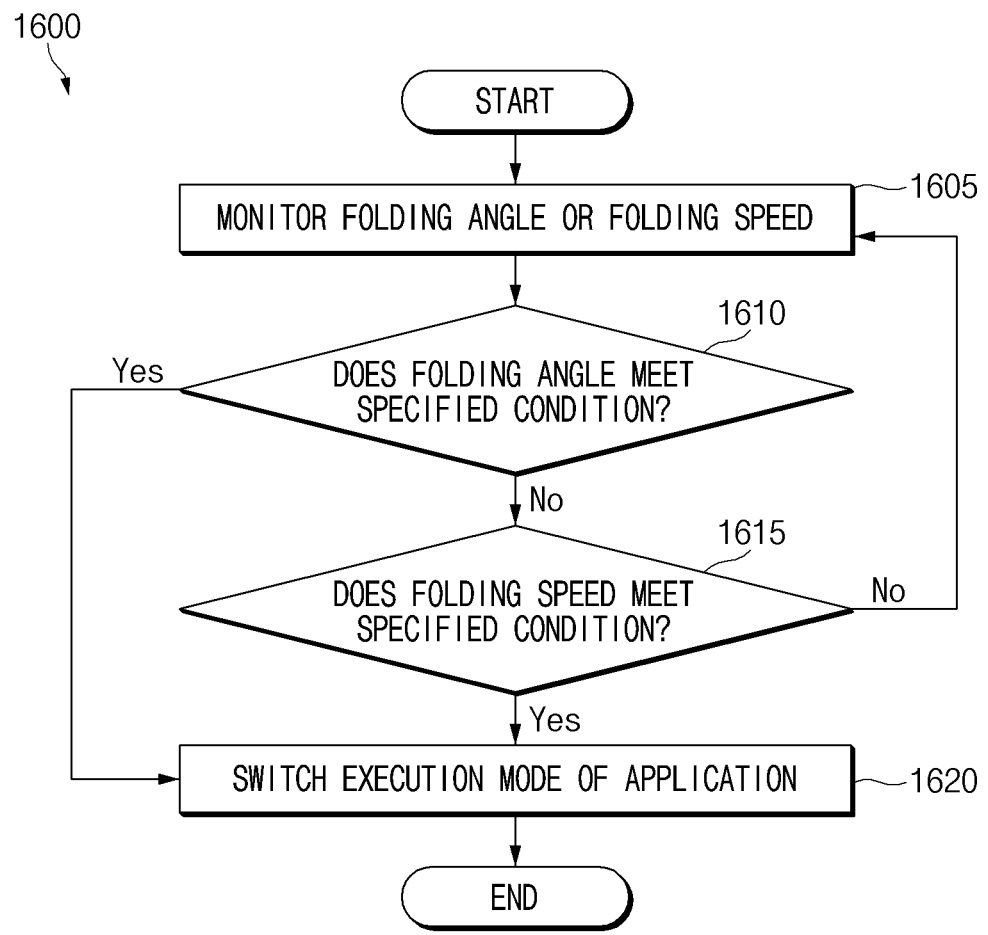
FIG. 16 illustrates an operational flowchart of an electronic device, according to an example embodiment.

FIG. 16 illustrates an operational flowchart 1600 of an electronic device, according to an embodiment.

According to an embodiment, the electronic device (e.g., an electronic device 101 of FIG. 1) may perform operations disclosed in FIG. 16. For example, a processor (e.g., a processor 120 of FIG. 1) of the electronic device may be configured to perform operations of FIG. 16 when executing instructions stored in a memory (e.g., a memory 130 of FIG. 1). An operation of the electronic device according to FIG. 16 may be referred to as an operation after the operation of FIG. 12 and the operation of FIG. 14 are performed.

In operation 1605, the electronic device may monitor a folding angle or a folding speed in real time or depending on a specified period. For example, the electronic device may identify a folding angle of the electronic device using a sensor circuit (e.g., a sensor module 176 of FIG. 1) and may calculate a folding speed based on the identified folding angle.

In operation 1610, the electronic device may determine whether the monitored folding angle meets a specified condition. The specified condition in operation 1610 may be referred to as whether the folding angle of the electronic device belongs to a range for switching an execution mode of an application.

For example, the electronic device may determine whether the monitored folding angle belongs to a second range (e.g., a second range 912 or 1012 of FIG. 9 or 10).

When it is determined that the folding angle meets the specified condition (e.g., operation 1610—Yes) in operation 1610 (e.g., when the folding angle of the electronic device does not belong to the second range), the electronic device may perform operation 1620.

When it is determined that the folding angle does not meet the specified condition (e.g., operation 1610—No) in operation 1610 (e.g., when the folding angle of the electronic device belongs to the second range), the electronic device may perform operation 1615.

In operation 1615, the electronic device may determine whether the monitored folding speed meets a specified condition. The specified condition in operation 1615 may be referred to as whether the folding speed of the electronic device is greater than a reference speed. For example, the electronic device may determine whether the monitored folding speed is greater than the reference speed.

When it is determined that the folding speed meets the specified condition (e.g., operation 1615—Yes) in operation 1615, the electronic device may perform operation 1620.

When it is determined that the folding speed does not meet the specified condition (e.g., operation 1615—No) in operation 1615, the electronic device may repeatedly perform operation 1605.

In operation 1620, the electronic device may switch the execution mode of the application to execute the application. For example, while executing the application based on the first mode, when it is determined that the folding angle and/or the folding speed meets the specified condition, the electronic device may switch and execute the execution mode of the application which is being executed to the second mode.

A foldable electronic device according to an embodiment of the disclosure may include a flexible display, a sensor circuit configured to detect a folding angle of the foldable electronic device, a processor, and a memory operatively connected, directly or indirectly, with the processor. The memory may store instructions, when executed by the processor, causing the foldable electronic device to execute an application based on a first mode, when the folding angle of the foldable electronic device belongs to a first range, identify the folding angle depending on a first period using the sensor circuit, while executing the application in the first mode, switch an execution mode of the application from the first mode to a second mode, when the identified folding angle does not belong to the first range, and change a range for switching the execution mode of the application from the first range to a second range using at least a portion of the identified folding angle.

In an embodiment, the instructions may be configured to, when executed by the processor, cause the foldable electronic device to change the range for switching the execution mode of the application from the first range to the second range using a maximum or a high value among folding angles of the foldable electronic device, the folding angles being identified while executing the application based on the first mode.

In an embodiment, the foldable electronic device may further include a camera. The application may correspond to a first application configured to use the camera. The instructions may be configured to, when executed by the processor, cause the foldable electronic device to determine a maximum or a high value in the second range as a second value less than a first value corresponding to a maximum or a high value in the first range.

In an embodiment, the instructions may be configured to, when executed by the processor, cause the foldable electronic device to monitor a folding angle of the foldable electronic device using the sensor circuit and display guide information associated with a folding angle of the foldable electronic device for switching the execution mode of the application on one area of the flexible display, when the monitored folding angle belongs to between the first value and the second value.

In an embodiment, the foldable electronic device may further include a folding part and a first area and a second area of the flexible display, the first area and the second area being divided by the folding part. The instructions may be configured to, when executed by the processor, cause the foldable electronic device to display at least one image obtained using the camera on the second area, while executing the first application based on the first mode.

In an embodiment, the foldable electronic device may further include a camera. The application may correspond to a second application configured not to use the camera. The instructions may be configured to, when executed by the processor, cause the foldable electronic device to determine a maximum value in the second range as a third value greater than a first value corresponding to a maximum value in the first range.

In an embodiment, the instructions may be configured to, when executed by the processor, cause the foldable electronic device to monitor a folding angle of the foldable electronic device using the sensor circuit, while executing the application in the second mode, and switch the execution mode of the application from the second mode to the first mode, when the monitored folding angle is included in the second range.

In an embodiment, the instructions may be configured to, when executed by the processor, cause the foldable electronic device to switch the execution mode of the application from the first mode to the second mode, when a folding angle identified according to the first period does not belong to the first range, identify a folding angle of the foldable electronic device depending on a second period, using the sensor circuit, calculate a folding speed of the foldable electronic device using at least a portion of the identified folding angle, and generate a reference speed to switch the execution mode of the application, when the calculated folding speed is greater than a predetermined speed.

In an embodiment, the instructions may be configured to, when executed by the processor, cause the foldable electronic device to monitor a folding speed of the foldable electronic device using the sensor circuit while executing the application based on the first mode and switch the execution mode of the application from the first mode to the second mode, when the monitored folding speed is greater than the reference speed.

In an embodiment, the instructions may be configured to, when executed by the processor, cause the foldable electronic device to display information associated with switching the execution mode of the application based on the folding speed on one area of the flexible display.

A method for executing an application in a foldable electronic device according to an embodiment of the disclosure may include executing the application based on a first mode, when a folding angle of the foldable electronic device belongs to a first range, identifying the folding angle depending on a first period using a sensor circuit included in the foldable electronic device, while executing the application in the first mode, switching an execution mode of the application from the first mode to a second mode, when the identified folding angle does not belong to the first range, and changing a range for switching the execution mode of the application from the first range to a second range using at least a portion of the identified folding angle.

In an embodiment, the changing of the range for switching the execution mode of the application from the first range to the second range using the at least a portion of the identified folding angle may include changing the range for switching the execution mode of the application from the first range to the second range using a maximum value among folding angles of the foldable electronic device, the folding angles being identified while executing the application based on the first mode.

In an embodiment, the application may correspond to a first application configured to use a camera included in the foldable electronic device. The changing of the range for switching the execution mode of the application from the first range to the second range using the at least a portion of the identified folding angle may include determining a maximum value in the second range as a second value less than a first value corresponding to a maximum value in the first range.

In an embodiment, the method for executing the application in the foldable electronic device may further include monitoring a folding angle of the foldable electronic device using the sensor circuit and displaying guide information associated with a folding angle of the foldable electronic device for switching the execution mode of the application on one area of a flexible display included in the foldable electronic device, when the monitored folding angle belongs to between the first value and the second value.

In an embodiment, the method for executing the application in the foldable electronic device may further include displaying at least one image obtained using the camera on a second area of a flexible display included in the foldable electronic device, while executing the first application based on the first mode.

In an embodiment, the application may correspond to a second application configured not to use a camera included in the foldable electronic device. The changing of the range for switching the execution mode of the application from the first range to the second range using the at least a portion of the identified folding angle may further include determining a maximum value in the second range as a third value greater than a first value corresponding to a maximum value in the first range.

In an embodiment, the method for executing the application in the foldable electronic device may further include monitoring a folding angle of the foldable electronic device using the sensor circuit, while executing the application in the second mode and switching the execution mode of the application from the second mode to the first mode, when the monitored folding angle is included in the second range.

In an embodiment, the method for executing the application in the foldable electronic device may further include switching the execution mode of the application from the first mode to the second mode, when a folding angle identified according to the first period does not belong to the first range, identifying a folding angle of the foldable electronic device depending on a second period, using the sensor circuit, calculating a folding speed of the foldable electronic device using at least a portion of the identified folding angle, and generating a reference speed to switch the execution mode of the application, when the calculated folding speed is greater than a predetermined speed.

In an embodiment, the method for executing the application in the foldable electronic device may further include monitoring a folding speed of the foldable electronic device using the sensor circuit while executing the application based on the first mode and switching the execution mode of the application from the first mode to the second mode, when the monitored folding speed is greater than the reference speed.

In an embodiment, the method for executing the application in the foldable electronic device may further include displaying information associated with switching the execution mode of the application based on the folding speed on one area of the flexible display.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A foldable electronic device, comprising:
a flexible display;
a sensor configured to detect a folding angle of the foldable electronic device;
a processor; and
a memory operatively connected with the processor, wherein the memory stores instructions, and the processor is configured to cause the foldable electronic device to:
execute an application based on a first mode, when the folding angle of the foldable electronic device belongs to a first range;
identify the folding angle based on a first period using the sensor, while the application is in the first mode;
switch the application from the first mode to a second mode, when the identified folding angle does not belong to the first range; and
change a range for switching an execution mode of the application to a second range, different from the first range, using at least a portion of the identified folding angle.

2. The foldable electronic device of claim 1, wherein the processor is configured to cause the foldable electronic device to:
change the range for switching the execution mode of the application from the first range to the second range based on a maximum value among folding angles identified when the application is in the first mode.

3. The foldable electronic device of claim 1, further comprising:
a camera,
wherein the application includes a first application configured to use the camera, and
wherein the processor is configured to cause the foldable electronic device to:
determine a maximum value in the second range as a second value less than a first value corresponding to a maximum value in the first range.

4. The foldable electronic device of claim 3, wherein the processor is configured to cause the foldable electronic device to:
monitor a folding angle of the foldable electronic device based on the sensor; and
display guide information associated with a folding angle of the foldable electronic device for switching the execution mode of the application on an area of the flexible display, when the monitored folding angle is between the first value and the second value.

5. The foldable electronic device of claim 3, further comprising:
a folding part,
wherein the flexible display includes a first area and a second area divided by the folding part, and
wherein the processor is configured to cause the foldable electronic device to:
display a user interface associated with controlling the camera on the first area and display at least one image obtained via the camera on the second area, when the first application is in the first mode.

6. The foldable electronic device of claim 1, further comprising:
a camera,
wherein the application corresponds to at least a second application configured not to use the camera, and
wherein the processor is configured to cause the foldable electronic device to:
determine a maximum value in the second range as a third value greater than a first value corresponding to a maximum value in the first range.

7. The foldable electronic device of claim 1, wherein the processor is configured to cause the foldable electronic device to:

monitor a folding angle of the foldable electronic device via the sensor, when the application is in the second mode; and switch the execution mode of the application from the second mode to the first mode, based on the monitored folding angle being in the second range.

8. The foldable electronic device of claim 1, wherein the processor is configured to cause the foldable electronic device to:

identify a folding angle of the foldable electronic device based on a second period different from the first period when switching the execution mode of the application from the first mode to the second mode, when the folding angle identified according to the first period does not belong to the first range;

calculate a folding speed of the foldable electronic device using at least a portion of the folding angle identified according to the second period; and generate a reference speed used to switch the execution mode of the application, when the calculated folding speed is greater than a predetermined speed.

9. The foldable electronic device of claim 8, wherein the processor is configured to cause the foldable electronic device to:

monitor a folding speed of the foldable electronic device via the sensor while executing the application based on the first mode; and switch the execution mode of the application from the first mode to the second mode, based on the monitored folding speed being greater than the reference speed.

10. The foldable electronic device of claim 9, wherein the processor is configured to cause the foldable electronic device to:

display information associated with switching the execution mode of the application based on the folding speed on an area of the flexible display.

11. A method for executing an application in a foldable electronic device including a display, the method comprising:

executing the application based on a first mode, when a folding angle of the foldable electronic device is in a first range;

identifying the folding angle based on a first period using a sensor circuit included in the foldable electronic device, while executing the application in the first mode;

switching the application from the first mode to a second mode, when the identified folding angle is not in the first range; and changing a range for switching an execution mode of the application to a second range, different from the first range, using at least a portion of the identified folding angle.

12. The method of claim 11, wherein the changing of the range for switching the execution mode of the application from the first range to the second range using the at least a portion of the identified folding angle includes:

changing the range for switching the execution mode of the application from the first range to the second range using a maximum value among folding angles identified while executing the application in the first mode.

13. The method of claim 11, wherein the application includes a first application configured to use a camera included in the foldable electronic device, and wherein the changing of the range for switching the execution mode of the application from the first range to the second range using the at least a portion of the identified folding angle includes:

determining a maximum and/or high value in the second range as a second value less than a first value corresponding to a maximum value in the first range.

14. The method of claim 13, further comprising:

monitoring a folding angle of the foldable electronic device using the sensor circuit; and displaying guide information associated with a folding angle of the foldable electronic device for switching the execution mode of the application on an area of the display included in the foldable electronic device, when the monitored folding angle belongs to between the first value and the second value, and wherein the display comprises a flexible display.

15. The method of claim 13, further comprising:

displaying a user interface associated with controlling the camera on a first area of the display and displaying at least one image obtained using the camera on a second area of the display included in the foldable electronic device, while executing the first application based on the first mode, wherein the display comprises a flexible display.

* * * * *